United States Patent
Kummer et al.

(10) Patent No.: US 8,819,722 B2
(45) Date of Patent: Aug. 26, 2014

(54) SMARTCARD ENCRYPTION CYCLING

(71) Applicant: EchoStar Technologies, LLC, Englewood, CO (US)

(72) Inventors: David Kummer, Highlands Ranch, CO (US); Germar Schaefer, Monument, CO (US)

(73) Assignee: Echostar Technologies L.L.C., Englewood, CO (US)

(*) Notice: Subject to any disclaimer, the term of this patent is extended or adjusted under 35 U.S.C. 154(b) by 0 days.

(21) Appl. No.: 13/828,001

(22) Filed: Mar. 14, 2013

(65) Prior Publication Data
US 2013/0247090 A1 Sep. 19, 2013

Related U.S. Application Data

(60) Provisional application No. 61/611,483, filed on Mar. 15, 2012, provisional application No. 61/745,710, filed on Dec. 24, 2012.

(51) Int. Cl.
*H04N 7/167* (2011.01)
*H04N 5/445* (2011.01)
*H04N 7/20* (2006.01)

(52) U.S. Cl.
USPC .................................. 725/31; 725/54; 725/63

(58) Field of Classification Search
None
See application file for complete search history.

(56) References Cited

U.S. PATENT DOCUMENTS

| | | | |
|---|---|---|---|
| 4,723,246 A | 2/1988 | Weldon, Jr. | |
| 4,802,215 A | 1/1989 | Mason | |
| 5,488,658 A | 1/1996 | Hirashima | |
| 5,974,218 A | 10/1999 | Nagasaka et al. | |
| 7,715,552 B2* | 5/2010 | Pinder et al. | 380/28 |
| 7,730,517 B1 | 6/2010 | Rey et al. | |
| 7,760,986 B2* | 7/2010 | Beuque | 386/248 |

(Continued)

FOREIGN PATENT DOCUMENTS

| | | |
|---|---|---|
| EP | 0 903 743 A | 3/1999 |
| EP | 0 973 333 A | 1/2000 |

(Continued)

OTHER PUBLICATIONS

International Search Report and Written Opinion of PCT/US2013/32176 mailed on Jun. 25, 2013. 15 pages.

(Continued)

*Primary Examiner* — Brian T Pendleton
*Assistant Examiner* — Jean D Saint Cyr
(74) *Attorney, Agent, or Firm* — Kilpatrick Townsend & Stockton LLP

(57) ABSTRACT

Various arrangements for encrypting multiple television channels are presented. A first television channel of a plurality of television channels to be protected via a first entitlement control message (ECM) using a first encryption scheme may be designated. The plurality of television channels may be transmitted using a single transponder stream. A second television channel of the plurality of television channels to be protected via a second ECM encrypted using a second encryption scheme while the first television channel of the plurality of television channels is protected using the first encryption scheme may be designated. The first and second ECMs may be transmitted to a plurality of television receivers. Data from the first ECM may be used for descrambling of the first television channel by the plurality of television receivers. Data from the second ECM may be used for descrambling of the second television channel by the plurality of television receivers.

16 Claims, 9 Drawing Sheets

(56) References Cited

U.S. PATENT DOCUMENTS

| | | | |
|---|---|---|---|
| 7,856,557 B2 * | 12/2010 | Beuque | 713/181 |
| 7,929,697 B2 | 4/2011 | McNeely et al. | |
| 2002/0044658 A1 * | 4/2002 | Wasilewski et al. | 380/239 |
| 2002/0144266 A1 | 10/2002 | Goldman et al. | |
| 2002/0164147 A1 | 11/2002 | Suda | |
| 2003/0026423 A1 * | 2/2003 | Unger et al. | 380/217 |
| 2004/0268387 A1 | 12/2004 | Wendling | |
| 2006/0056800 A1 | 3/2006 | Shimagami et al. | |
| 2006/0274208 A1 * | 12/2006 | Pedlow, Jr. | 348/572 |
| 2007/0192586 A1 * | 8/2007 | McNeely | 713/153 |
| 2007/0258596 A1 * | 11/2007 | Kahn et al. | 380/284 |
| 2008/0298585 A1 | 12/2008 | Maillard et al. | |
| 2009/0067621 A9 | 3/2009 | Wajs | |
| 2009/0080930 A1 | 3/2009 | Shinotsuka et al. | |
| 2009/0172722 A1 * | 7/2009 | Kahn et al. | 725/31 |
| 2009/0254962 A1 | 10/2009 | Hendricks et al. | |
| 2009/0320073 A1 * | 12/2009 | Reisman | 725/51 |
| 2010/0086277 A1 | 4/2010 | Craner | |
| 2010/0100899 A1 | 4/2010 | Bradbury et al. | |
| 2010/0135639 A1 | 6/2010 | Ellis et al. | |
| 2010/0158479 A1 | 6/2010 | Craner | |
| 2010/0247067 A1 | 9/2010 | Gratton | |
| 2011/0007218 A1 | 1/2011 | Moran et al. | |
| 2011/0131413 A1 * | 6/2011 | Moon et al. | 713/168 |
| 2011/0138169 A1 * | 6/2011 | Michel | 713/150 |
| 2011/0162011 A1 | 6/2011 | Hassell et al. | |
| 2011/0225616 A1 | 9/2011 | Ellis | |
| 2011/0311045 A1 | 12/2011 | Candelore et al. | |
| 2013/0243397 A1 | 9/2013 | Minnick et al. | |
| 2013/0243398 A1 | 9/2013 | Templeman et al. | |
| 2013/0243399 A1 | 9/2013 | Casagrande et al. | |
| 2013/0243402 A1 | 9/2013 | Kummer et al. | |
| 2013/0243403 A1 | 9/2013 | Martch | |
| 2013/0243405 A1 | 9/2013 | Templeman et al. | |
| 2013/0243406 A1 | 9/2013 | Kirby | |
| 2013/0247089 A1 | 9/2013 | Kummer et al. | |
| 2013/0247106 A1 | 9/2013 | Martch et al. | |
| 2013/0247107 A1 | 9/2013 | Templeman | |
| 2013/0247111 A1 | 9/2013 | Templeman et al. | |

FOREIGN PATENT DOCUMENTS

| | | |
|---|---|---|
| EP | 1 168 347 A | 1/2002 |
| EP | 1372339 A2 | 12/2003 |
| EP | 2 018 059 A1 | 1/2009 |
| EP | 1 667 452 B1 | 11/2011 |
| WO | 2004/057610 A1 | 7/2004 |
| WO | 2008/010689 A1 | 1/2008 |
| WO | 2008/060486 A2 | 5/2008 |

OTHER PUBLICATIONS

International Search Report and Written Opinion of PCT/US2013/031565 mailed on May 31, 2013, 103 pages.

International Search Report and Written Opinion of PCT/US2013/031915 mailed on Jun. 3, 2013, 7 pages.

International Search Report of PCT/KR2007/003521 mailed on Oct. 23, 2007.

International Search Report of PCT/IB2003/005737 mailed on Mar. 3, 2004.

Jensen, Craig. "Fragmentation: the condition, the cause, the cure" 'Online!, Executive Software International, 1994; retrieved from Internet: <URL: www.executive.com/fragbook.fragbook.htm> retrieved on Mar. 2, 2004! * Chapter: "How a disk works", Section: "The original problem".

U.S. Appl. No. 13/795,914, filed Mar. 6, 2013, Non-Final Office Action mailed Oct. 11, 2013, 17 pages.

* cited by examiner

SMARTCARD ENCRYPTION CYCLING

CROSS-REFERENCES TO RELATED APPLICATIONS

This application claims priority to co-pending U.S. provisional application 61/611,483, filed Mar. 15, 2012, entitled "Reception, Recording, Storage, and Manipulation of Multiple Television Channels,", the entire disclosure of which is hereby incorporated by reference for all purposes.

This application claims priority to co-pending U.S. provisional application 61/745,710, filed Dec. 24, 2012, entitled "Smartcard Encryption Cycling,", the entire disclosure of which is hereby incorporated by reference for all purposes.

BACKGROUND OF THE INVENTION

A television viewer may desire to watch and/or record multiple television channels at the same time. For instance, during weekday primetime, many television programs may be broadcast simultaneously on different television channels that the television viewer desires to either watch live or store for later viewing. For many cable and satellite television distribution systems, a set-top box may be used to receive, store, and display television channels on a television (or other form of display device). Such set-top boxes may have limited capabilities to concurrently display and/or store multiple television channels at the same time.

SUMMARY

In some embodiments, a system for encrypting multiple television channels, is presented. The system may include one or more processors. The system may include a memory communicatively coupled with and readable by the one or more processors and having stored therein processor-readable instructions. When executed by the one or more processors, the instructions may cause the one or more processors to designate a first television channel of a plurality of television channels to be protected via a first entitlement control message using a first encryption scheme. The plurality of television channels may be transmitted using a single transponder stream. The instructions may cause the one or more processors to designate a second television channel of the plurality of television channels to be protected via a second entitlement control message encrypted using a second encryption scheme while the first television channel of the plurality of television channels is protected using the first encryption scheme. The instructions may cause the one or more processors to cause the first entitlement control message encrypted using the first encryption scheme and a second entitlement control message encrypted using the second encryption scheme to be transmitted to a plurality of television receivers. Data from the first entitlement control message may be used for descrambling of the first television channel by the plurality of television receivers. Data from the second entitlement control message may be used for descrambling of the second television channel by the plurality of television receivers.

Embodiments of such a system may include one or more of the following: The first entitlement control message encrypted using the first encryption scheme may require more processing by a television receiver of the plurality of television receivers to decrypt than the second entitlement control message encrypted using the second encryption scheme. The instructions may cause the one or more processors to cause the plurality of channels to be transmitted concurrently to a plurality of television receivers using the single transponder stream. Data from the first entitlement control message may be required to descramble the first television channel. Data from the second entitlement control message may be required to concurrently descramble the second television channel during a time period the first television channel is being descrambled. At a given time, only one television channel of the plurality of television channels transmitted concurrently using the single transponder stream may be protected using the first encryption scheme. The system may include a television receiver comprising a smartcard, the television receiver configured to decrypt the first entitlement control message, wherein the television receiver is of the plurality of television receivers. The television receiver may be configured to decrypt the second entitlement control message. The television receiver may be configured to descramble the first television channel using data from the first entitlement control message. The television receiver may be configured to descramble the second television channel using data from the second entitlement control message concurrently while descrambling the first television channel using data from the first entitlement control message.

Additionally or altnernatively, embodiments of such a system may include one or more of the following: The television receiver being configured to decrypt the first entitlement control message may take a longer period of time to process than decrypting the second entitlement control message. The instructions may cause the one or more processors to, after the television service provider has transmitted the first entitlement control message and the second entitlement control message: designate the first television channel of the plurality of television channels to be protected via a third entitlement control message encrypted using the second encryption scheme; designate the second television channel of the plurality of television channels to be protected via a fourth entitlement control message encrypted using the first encryption scheme while the first television channel of the plurality of television channels is protected using the second encryption scheme; and cause the third entitlement control message encrypted using the second encryption scheme and the fourth entitlement control message encrypted using the first encryption scheme to be transmitted. The third entitlement control message may be used for decryption of the first television channel. The fourth entitlement control message may be used for decryption of the second television channel.

In some embodiments, a method for encrypting multiple television channels is presented. The method may include designating, by the television service provider system, a first television channel of a plurality of television channels to be protected via a first entitlement control message using a first encryption scheme. The plurality of television channels may be transmitted using a single transponder stream. The method may include designating, by the television service provider system, a second television channel of the plurality of television channels to be protected via a second entitlement control message encrypted using a second encryption scheme while the first television channel of the plurality of television channels is protected using the first encryption scheme. The method may include transmitting, by the television service provider system, the first entitlement control message encrypted using the first encryption scheme and a second entitlement control message encrypted using the second encryption scheme to a plurality of television receivers. Data from the first entitlement control message may be used for descrambling of the first television channel by the plurality of television receivers. Data from the second entitlement control message may be used for descrambling of the second television channel by the plurality of television receivers.

Embodiments of such a method may include one or more of the following: The first entitlement control message encrypted using the first encryption scheme may require more processing by a television receiver of the plurality of television receivers to decrypt than the second entitlement control message encrypted using the second encryption scheme. The method may include transmitting, by the television service provider system, the plurality of channels concurrently to a plurality of television receivers using the single transponder stream. Data from the first entitlement control message may be required to descramble the first television channel. Data from the second entitlement control message may be required to concurrently descramble the second television channel during a time period the first television channel is being descrambled. At a given time, only one television channel of the plurality of television channels transmitted concurrently using the single transponder stream may be protected using the first encryption scheme.

The method may include decrypting, by a smartcard of a television receiver, the first entitlement control message, wherein the television receiver is of the plurality of television receivers. The method may include decrypting, by the smartcard of the television receiver, the second entitlement control message. The method may include descrambling, by the television receiver, the first television channel using data from the first entitlement control message. The method may include descrambling, by the television receiver, the second television channel using data from the second entitlement control message concurrently while descrambling the first television channel using data from the first entitlement control message. Decrypting, by the smartcard of the television receiver, the first entitlement control message may take a longer period of time than decrypting the second entitlement control message. The method may include, after the television service provider has transmitted the first entitlement control message and the second entitlement control message: designating, by the television service provider system, the first television channel of the plurality of television channels to be protected via a third entitlement control message encrypted using the second encryption scheme; designating, by the television service provider system, the second television channel of the plurality of television channels to be protected via a fourth entitlement control message encrypted using the first encryption scheme while the first television channel of the plurality of television channels is protected using the second encryption scheme; and transmitting, by the television service provider system, the third entitlement control message encrypted using the second encryption scheme and the fourth entitlement control message encrypted using the first encryption scheme. The third entitlement control message may be used for decryption of the first television channel. The fourth entitlement control message may be used for decryption of the second television channel.

In some embodiments, a non-transitory processor-readable medium for encrypting multiple television channels is presented. The non-transitory processor-readable medium may include processor-readable instructions configured to cause one or more processors to designate a first television channel of a plurality of television channels to be protected via a first entitlement control message using a first encryption scheme. The plurality of television channels may be transmitted using a single transponder stream. The instructions may be configured to cause one or more processors to designate a second television channel of the plurality of television channels to be protected via a second entitlement control message encrypted using a second encryption scheme while the first television channel of the plurality of television channels is protected using the first encryption scheme. The instructions may be configured to cause one or more processors to cause the first entitlement control message encrypted using the first encryption scheme and a second entitlement control message encrypted using the second encryption scheme to be transmitted to a plurality of television receivers. Data from the first entitlement control message may be used for descrambling of the first television channel by the plurality of television receivers. Data from the second entitlement control message may be used for descrambling of the second television channel by the plurality of television receivers.

Embodiments of such a non-transitory processor-readable medium may include one or more of the following: The first entitlement control message encrypted using the first encryption scheme may require more processing by a television receiver of the plurality of television receivers to decrypt than the second entitlement control message encrypted using the second encryption scheme. The instructions may be configured to cause one or more processors to cause the plurality of channels to be transmitted concurrently to a plurality of television receivers using the single transponder stream. Data from the first entitlement control message may be required to descramble the first television channel. Data from the second entitlement control message may be required to concurrently descramble the second television channel during a time period the first television channel is being descrambled. At a given time, only one television channel of the plurality of television channels transmitted concurrently using the single transponder stream may be protected using the first encryption scheme. The instructions may be configured to cause one or more processors to, after the television service provider has transmitted the first entitlement control message and the second entitlement control message: designate the first television channel of the plurality of television channels to be protected via a third entitlement control message encrypted using the second encryption scheme; designate the second television channel of the plurality of television channels to be protected via a fourth entitlement control message encrypted using the first encryption scheme while the first television channel of the plurality of television channels is protected using the second encryption scheme; and cause the third entitlement control message encrypted using the second encryption scheme and the fourth entitlement control message encrypted using the first encryption scheme to be transmitted. The third entitlement control message may be used for decryption of the first television channel. The fourth entitlement control message may be used for decryption of the second television channel.

BRIEF DESCRIPTION OF THE DRAWINGS

A further understanding of embodiments of the invention may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
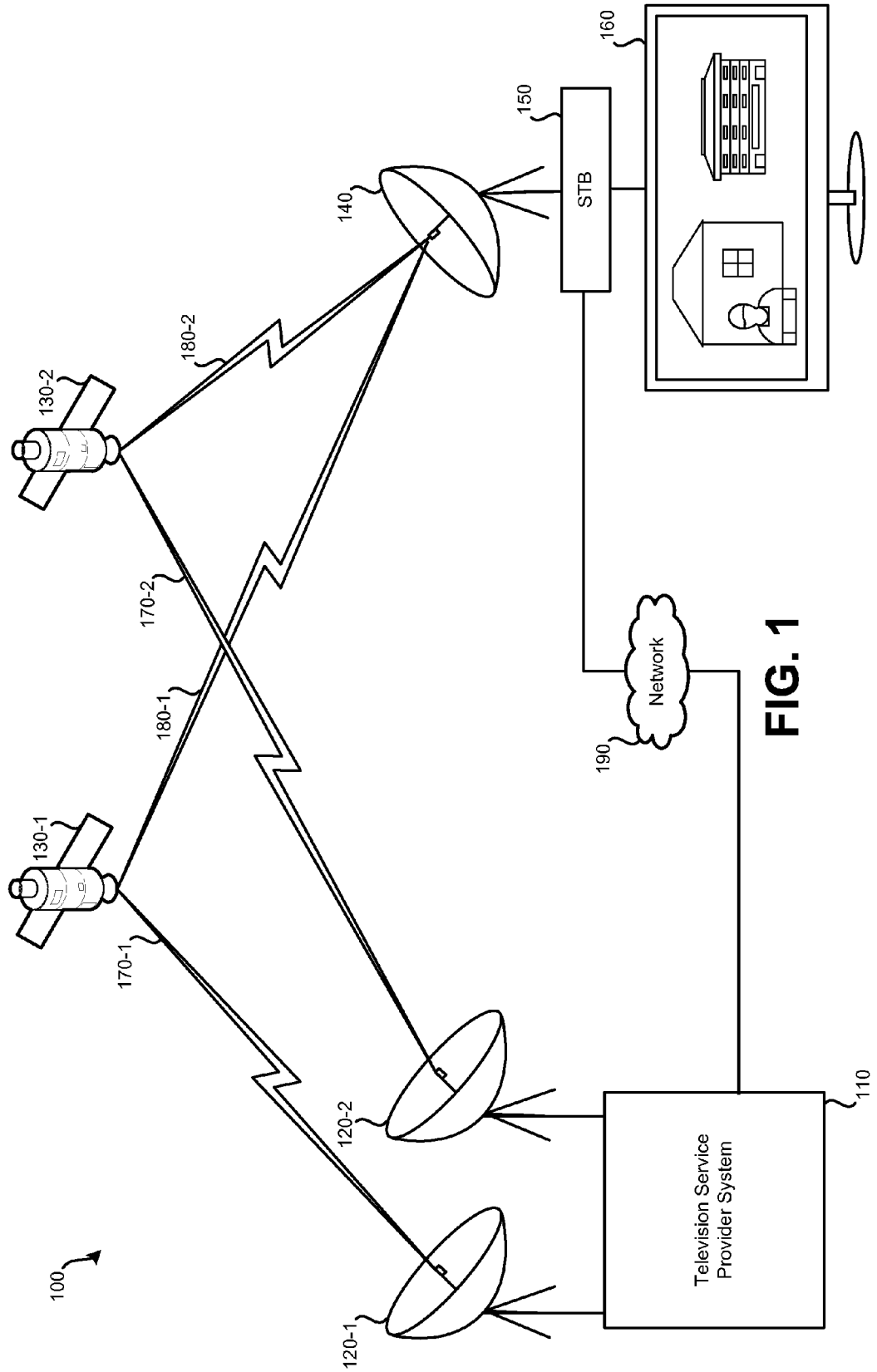
FIG. 1 illustrates an embodiment of a satellite television distribution system.

In some situations, a user (e.g., a television service subscriber) may desire to watch and/or record multiple television channels concurrently. For example, while the user is watching a first television program on a first television channel, the user may be recording a second television program on a second television channel using a digital video recorder (DVR). As such, the second television program may be available for presentation to the user (or someone else) at a later time. In some situations, rather than a user desiring to watch and/or record two television channels at a given time, three or more television channels may be watched and/or recorded simultaneously (e.g., one television channel may be watched while three others are concurrently recorded). Such a situation may be common in a household where multiple persons each desire to watch different television programs broadcast simultaneously. While in an ideal situation it may be possible to watch and/or record every available television channel concurrently, a limiting factor may be the television service receiving equipment. For instance, for many television service providers, a set top box (STB) is necessary to decrypt and/or decode television channels (and/or other related television services) from the television service provider for storage and/or presentation via a presentation device (e.g., a television). Such a STB may only be able to tune to and/or decode a finite number of television channels simultaneously.

In order to control access to television channels distributed by the television service provider, television channels may be protected by the television service provider to prevent non-subscribers from acquiring unauthorized (e.g., free) access. In some embodiments, to accomplish this goal, STBs contain a smartcard that is used to decrypt entitlement control messages. An entitlement control message may contain data (possibly referred to as a control word (CW)), that is used to descramble television channels. As such, to descramble a television channel using a control word, the control word may need to be obtained from a corresponding ECM. An ECM may be encrypted and may need to be decrypted to obtain one or more CWs from the ECM. These CWs may then be used to descramble one or more television channels.

A smartcard may have a finite ability to decrypt ECMs. Such a finite ability may be due to the smartcard's processing power and/or other limits on the ability of the smartcard to decrypt multiple ECMs during a given time period. Such a finite ability may not be an issue when a single television channel is tuned to by a STB. However, if a user is attempting to view and/or record multiple television channels simultaneously, the number of ECMs requiring decryption during a given time period may increase. For instance, in some embodiments, each television channel is associated with its own ECMs. Therefore, for a given time period, a different ECM may need to be decrypted for each television channel being received for presentation and/or recording. In some embodiments, a new ECM is decrypted for a television channel every ten seconds. If the STB is receiving five television channels, this may mean that five different ECMs are to be decrypted every ten seconds.

While it may be possible to use multiple smartcards or a smartcard with increased processing power to increase the number of ECMs that can be decrypted over a given time period, it may be worthwhile, such as for cost concerns, to use a smartcard with limited abilities to decrypt ECMs. In order to increase the number of television channels that can be simultaneously stored and/or recorded, the number of ECMs that can be decrypted over a given time period may need to be increased.

It should be understood that data may be received by a STB from a television service provider in the form of one or more transponder streams; as such "simultaneously" or "concurrently" storing and/or recording multiple television channels may refer to over a given period of time performing such functions for multiple television channels. For example, simultaneously or concurrently recording two television channels refers to performing functions related to recording two television channels transmitted during the same time period (e.g., 8:00 PM-8:30 PM). During this time period, ECMs may need to be decrypted for each of the multiple television channels in order for the television channels to be simultaneously or concurrent presented and/or recorded.

Instead of each television channel being protected via an ECM encrypted using the same encryption scheme, one or more television channels may be protected via ECMs encrypted using a higher level of encryption (referred to as "heavy" encryption) than other television channels. An ECM encrypted using heavy encryption may require more processing to decode by a STB's smartcard than an ECM encrypted using a lower level of encryption (referred to as "light" encryption). To enable a smartcard to decode ECMs related to multiple channels desired to be decoded for storage and/or viewing simultaneously, television channels may be protected by ECMs encrypted using light encryption. Such light encrypted ECMs may be more quickly (e.g., requiring less processing) decrypted by a STB's decryption smartcard. Some number of television channels may be protected by ECMs encrypted using heavy encryption that require longer (e.g., requiring more processing) to be decrypted by the decryption smartcard. A smartcard may be able to handle decryption for a given number of television channels protected by "heavy" encrypted ECMs and by "light" encrypted ECMs concurrently. As such, if only a limited number of television channels (e.g., one) are being received for recording and/or presentation, at a given time, is protected using heavy encryption, a smartcard may be able to handle decryption of the ECMs for multiple television channels due to the majority of television channels being protected by ECMs with "light" encryption (which require less processing for the smartcard to decrypt).

Which one or more television channels are protected by ECMs encrypted using heavy and light encryption may rotate. For example, on a particular transponder used to transmit a transponder stream containing multiple television channels, at a given time one of the television channels may be protected by an ECM encrypted using heavy encryption. Each other television channel in the transponder stream at the given time may be protected by ECMs encrypted using light encryption. After a predefined period of time, the television channels protected by an ECM encrypted using heavy encryption may rotate. As such, at any given time, in this example, only a single television channel transmitted in the transponder stream may be protected by an ECM encrypted using heavy encryption. Therefore, at a STB receiving at least some of the multiple television channels, a smartcard may only need to decrypt one ECM encrypted using heavy encryption (with the other ECMs encrypted using light encryption) over a given period of time, thus allowing the smartcard to decode all required ECMs in a timely manner.

Rotating which television channels out of a group of television channels is protected by an ECM encrypted using heavy or light encryption may be sufficient to protect all of the television channels. For instance, while a non-subscriber (e.g., a person making unauthorized access to the television service provider's network) may have equipment sufficient to crack the light encryption, the equipment may not be sufficient to crack the heavy encryption in a timely manner. If, for example, ten seconds of a television channel transmitted by the television service provider is protected by a heavy encrypted ECM (with the remainder of the time being protected by a light encrypted ECM), the television channel may be rendered unenjoyable to the non-subscriber because 10 seconds of each minute of the television channel's audio and/or video would be unable to be descrambled, thus ruining the non-subscribers viewing/listening experience. Since each of the television channels would have a ten second chunk each minute protected by a heavy encrypted ECM, each of the television channels may be rendered unenjoyable to the non-subscriber.

Such arrangements may be especially useful when multiple television channels are to be watched and/or recorded from a single transponder stream. For instance, a television service provider may group television channels that are likely to be desired by users to be watched and/or recorded concurrently onto a single transponder stream. For instance, a single transponder stream may be used to carry each of the major television networks (e.g., ABC, CBS, NBC, and FOX). A single tuner of a STB may be used to simultaneously receive each of the television channels transmitted in the same transponder stream. The television service provider may rotate which of the television channel channels in the transponder stream are protected by an ECM encrypted by heavy and light encryption.

FIG. 1 illustrates an embodiment of a satellite television distribution system 100. Satellite television distribution system 100 may include: television service provider system 110, satellite transmitter equipment 120, satellites 130, satellite dish 140, set-top box 150, and television 160. Alternate embodiments of satellite television distribution system 100 may include fewer or greater numbers of components. While only one satellite dish 140, set-top box 150, and television 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programing, programming information, and/or other services to users. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances satellite transmitting equipment may communicate with the same or with different satellites. Different television channels may be transmitted to satellites 130 from different instances of transmitting equipment. For instance, a different satellite dish of transmitting equipment 120 may be used for communication with satellites in different orbital slots.

Satellites 130 may be configured to receive signals, such as transponder streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink transponder streams 170 from transponder stream 180. Satellites 130 may be in geosynchronous orbit. Each satellite 130 may be in a different orbital slot, such that the signal path between each satellite, uplink stations, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite uplink 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of set-top box (STB) 150 and/or satellite dish 140, it may only be possible to capture transponder streams from a limited number of transponders concurrently. For example, a tuner of STB 150 may only be able to tune to a single transponder stream from a transponder of a single satellite at a time.

Figure 2:
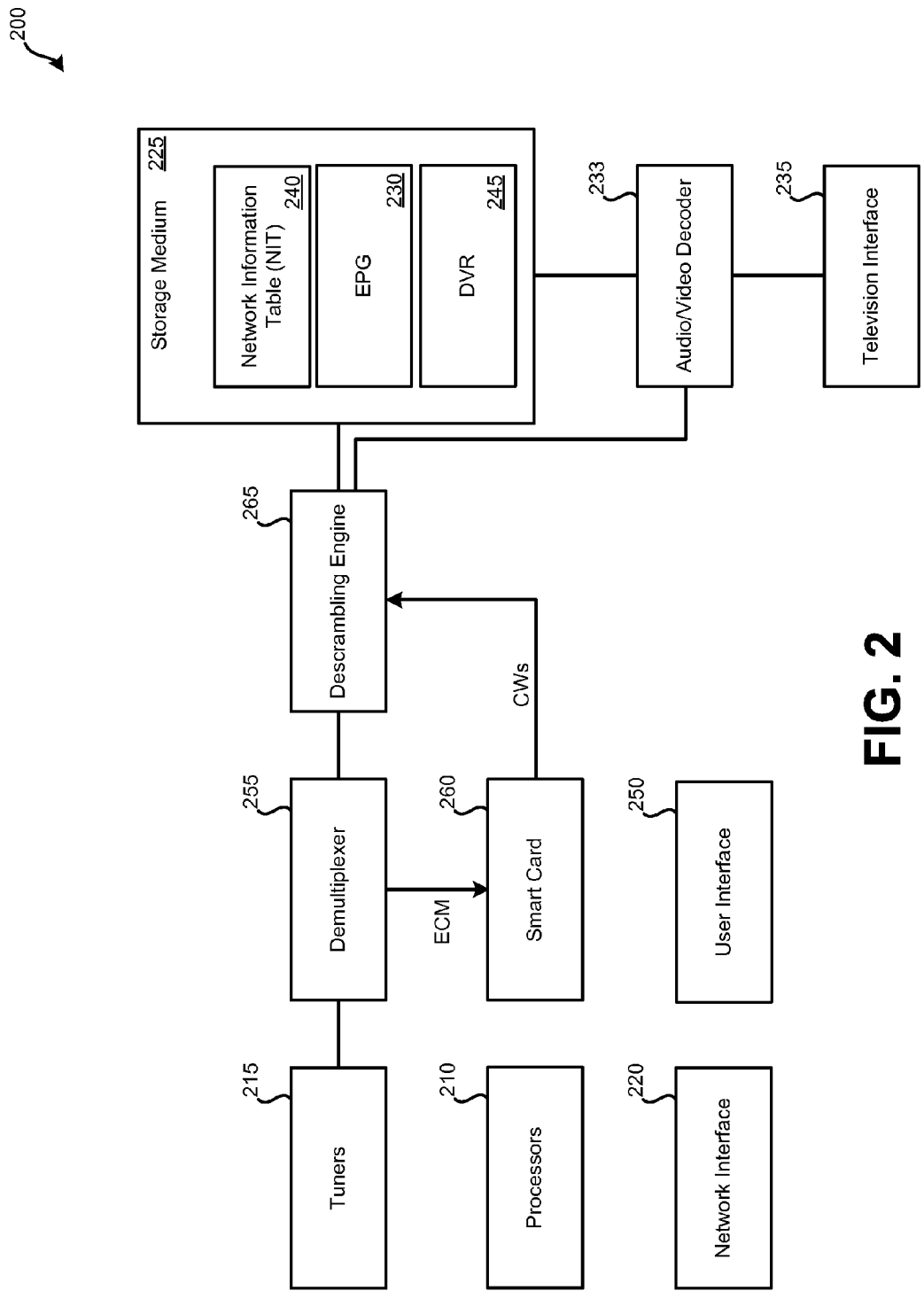
FIG. 2 illustrates an embodiment of a set-top box (STB).

In communication with satellite dish 140, may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of set-top box 150. As such, set-top box 150 may decode signals received via satellite dish 140 and provide an output to television 160. FIG. 2 provides additional detail of receiving equipment.

Television 160 may be used to present video and/or audio decoded by set-top box 150. Set-top box 150 may also output a display of one or more interfaces to television 160, such as an electronic programming guide (EPG). In some embodiments, a display device other than a television may be used.

Uplink transponder stream 170-1 represents a signal between satellite uplink 120 and satellite 130-1. Uplink transponder stream 170-2 represents a signal between satellite uplink 120 and satellite 130-2. Each of uplink transponder streams 170 may contain streams of one or more different television channels. For example, uplink transponder stream 170-1 may contain a certain group of television channels, while uplink transponder stream 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay 32 transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. STB 150 may decode the received transponder stream. As such, depending on which television channel(s) are desired, a transponder stream from a different satellite (or a different transponder of the same satellite) may be accessed and decoded by STB 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and set-top box 150. Via such a secondary communication channel, bidirectional exchange of data may occur. As such, data may be transmitted to television service provider system 110 via network 190. Data may also be transmitted from television service provider system 110 to STB 150 via network 190. Network 190 may be the Internet. While audio and video services may be provided to STB 150 via satellites 130, feedback from STB 150 to television service provider system 110 may be transmitted via network 190.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

FIG. 2 illustrates a block diagram of an embodiment of a set-top box 200. STB 200 may be set-top box 150 of FIG. 1, or may be incorporated as part of a television, such as television 160 of FIG. 1. STB 200 may include: processors 210, tuners 215, network interface 220, non-transitory computer-readable storage medium 225, electronic programming guide (EPG) 230, television interface 235, networking information table (NIT) 240, digital video recorder (DVR) 245, user interface 250, demultiplexer 255, smart card 260, and/or descrambling engine 265. In other embodiments of STB 200, fewer or greater numbers of components may be present. It should be understood that the various components of STB 200 may be implemented using hardware, firmware, software, and/or some combination thereof. For example, EPG 230 may be executed by processors 210.

FIG. 2 illustrates an embodiment of STB 200, which may typically be in the form of a separate device configured to be connected with a presentation device, such as a television. Embodiments of STB 200 may also be referred to as a "television receiver." In addition to being in the form of an STB, a television receiver may be incorporated into another device, such as a television. For example, a television may have an integrated television receiver (which does not involve an external STB being coupled with the television). A television receiver may contain some or all of the components of STB 200 and/or may be able to perform some or all of the functions of STB 200. Accordingly, instances in this document referring to an STB and steps being performed by an STB may also be performed, more generally, by a television receiver.

Processors 210 may include one or more general-purpose processors configured to perform processes such as tuning to a particular channel, displaying the EPG, and/or receiving and processing input from a user. Processors 210 may include one or more special purpose processors. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by processor 210.

Tuners 215 may include one or more tuners used to tune to television channels, such as television channels transmitted via satellite or cable. Each tuner contained in tuners 215 may be capable of receiving and processing a single stream of data from a satellite transponder (or a cable RF channel) at a given time. As such, a single tuner may tune to a single transponder (or cable RF channel). If tuners 215 include multiple tuners, one tuner may be used to tune to a television channel on a first transponder for display using a television, while another tuner may be used to tune to a television channel on a second transponder for recording and viewing at some other time. Still another tuner may be used to check various television channels to determine if they are available or not. If multiple television channels transmitted on the same transponder stream are desired, a single tuner of tuners 215 may be used to receive the signal containing the multiple television channels for presentation and/or recording.

Network interface 220 may be used to communicate via an alternate communication channel with a television service provider. For example, the primary communication channel may be via satellite (which may be unidirectional to the STB) and the alternate communication channel (which may be bidirectional) may be via a network, such as the Internet. Referring back to FIG. 1, STB 150 may be able to communicate with television service provider system 110 via a network, such as the Internet. This communication may be bidirectional: data may be transmitted from STB 150 to television service provider system 110 and from television service provider system 110 to STB 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent a non-transitory computer readable storage medium. Storage medium 225 may include memory and/or a hard drive. Storage medium 225 may be used to store information received from one or more satellites and/or information received via network interface 220. Storage medium 225 may store information related to EPG 230, NIT 240, and/or DVR 245. Recorded television programs may be stored using storage medium 225.

EPG 230 may store information related to television channels and the timing of programs appearing on such television channels. EPG 230 may be stored using non-transitory storage medium 225, which may be a hard drive. EPG 230 may be used to inform users of what television channels or programs are popular and/or provide recommendations to the user. EPG 230 may provide the user with a visual interface displayed by a television that allows a user to browse and select television channels and/or television programs for viewing and/or recording via DVR 245. Information used to populate EPG 230 may be received via network interface 220 and/or via satellites, such as satellites 130 of FIG. 1 via tuners 215. For instance, updates to EPG 230 may be received periodically via satellite. EPG 230 may serve as an interface for a user to control DVR 245 to enable viewing and/or recording of multiple television channels simultaneously.

Audio/video decoder 233 may serve to convert encoded video and audio into a format suitable for output to a display device. For instance, audio/video decoder 233 may receive MPEG video and audio from storage medium 225 or descrambling engine 265 to be output to a television. Audio/video decoder 233 may convert the MPEG video and audio into a format appropriate to be displayed by a television or other form of display device and audio into a format appropriate to be output from speakers, respectively.

Television interface 235 may serve to output a signal to a television (or another form of display device) in a proper format for display of video and playback of audio. As such, television interface 235 may output one or more television channels, stored television programing from storage medium 225 (e.g., DVR 245 and/or information from EPG 230) to a television for presentation.

The network information table (NIT) 240 may store information used by set-top box 200 to access various television channels. NIT 240 may be stored using storage medium 225. Information used to populate NIT 240 may be received via satellite (or cable) through tuners 215 and/or may be received via network interface 220 from the television service provider. As such, information present in NIT 240 may be periodically updated. NIT 240 may be locally-stored by STB 200 using storage medium 225. Information that may be present in NIT 240 may include: television channel numbers, a satellite identifier, a frequency identifier, a transponder identifier, an ECM PID, one or more audio PIDs, and a video PID. (A second audio PID of a channel may correspond to a second audio program (SAP), such as in another language.) In some embodiments, NIT 240 may be divided into additional tables. For example, rather than the specific audio PIDs and video PIDs being present in NIT 240, a channel identifier may be present within NIT 240 which may be used to lookup the audio PIDs and video PIDs in another table.

Table 1 provides a simplified example of NIT 240 for several television channels. It should be understood that in other embodiments, many more television channels may be represented in NIT 240. NIT 240 may be periodically updated by a television service provider. As such, television channels may be reassigned to different satellites and/or transponders, and STB 200 may be able to handle this reassignment as long as NIT 240 is updated.

TABLE 1

| Channel | Satellite | Transponder | ECM PID | Audio PIDs | Video PID |
|---------|-----------|-------------|---------|------------|-----------|
| 4       | 1         | 2           | 27      | 1001       | 1011      |
| 5       | 2         | 11          | 29      | 1002       | 1012      |
| 7       | 2         | 3           | 31      | 1003       | 1013      |
| 13      | 2         | 4           | 33      | 1003, 1004 | 1013      |

It should be understood that the values provided in Table 1 are for example purposes only. Actual values, including how satellites and transponders are identified, may vary. Additional information may also be stored in NIT 240. Additional information on how NIT 240, as indicated in Table 1, may be used is provided in reference to FIG. 3. Video and/or audio for different television channels on different transponders may have the same PIDs. Such television channels may be differentiated based on which satellite and/or transponder to which a tuner is tuned.

Digital Video Recorder (DVR) 245 may permit a television channel to be recorded for a period of time. DVR 245 may store timers that are used by processors 210 to determine when a television channel should be tuned to and recorded to DVR 245 of storage medium 225. In some embodiments, a limited amount of storage medium 225 may be devoted to DVR 245. Timers may be set by the television service provider and/or one or more users of the STB. DVR 245 may be configured by a user to record particular television programs. Whether a user directly tunes to a television channel or DVR 245 tunes to a first television channel, NIT 240 may be used to determine the satellite, transponder, ECM PID (packet identifier), audio PID, and video PID.

User interface 250 may include a remote control (physically separate from STB 200) and/or one or more button on STB 200 that allows a user to interact with STB 200. User interface 250 may be used to select a television channel for viewing, view EPG 230, and/or program DVR 245.

Referring back to tuners 215, television channels received via satellite (or cable) may contain at least some encrypted data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which in combination with NIT 240, can be determined to be associated with particular television channel. Particular data packets, referred to as entitlement control messages (ECMs) may be periodically transmitted. ECMs may be encrypted; STB 200 may use smart card 260 to decrypt ECMs. Decryption of an ECM may only be possible if the user has authorization to access the particular television channel associated with the ECM. When an ECM is received by demultiplexer 255 and the ECM is determined to correspond to a television channel being stored and/or displayed, the ECM may be provided to smart card 260 for decryption.

When smart card 260 receives an encrypted ECM from demultiplexer 255, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260.

When an ECM is received by smart card 260, it may take a period of time for the ECM to be decrypted to obtain the control words. As such, a period of time, such as 2 seconds, may elapse before the control words indicated by the ECM can be obtained. Smart card 260 may be permanently part of STB 200 or maybe configured to be inserted and removed from STB 200.

When an ECM is received by smart card 260, smart card 260 may not need to be informed which encryption scheme (e.g., a first or second encryption scheme) was used to encrypt the ECM. The encryption scheme may be determined by the number of bits present in the encrypted ECM. For instance, an encrypted ECM with a greater number of bits may be indicative of heavy encryption while an encrypted ECM with a fewer number of bits may be indicative of light encryption. Regardless of the type of encryption, upon receiving the encrypted ECM, the smartcard may perform the processing necessary to output the control words from the ECM. It may take a longer period of time for the smartcard to output the CWs determined from a heavy encrypted ECM than from a light encrypted ECM. For an ECM encrypted using the heavy encryption scheme, decryption may take a longer period of time (and, thus, more processing) than an ECM encrypted using a light encryption scheme. Regardless of whether CWs are obtained from a heavy encrypted ECM or a light encrypted ECM, descrambling of audio and/or video may be performed in a same manner using the CWs by descrambling engine 265.

It should be understood throughout that why embodiments detailed herein refer to heavy and light encryption, the encryption schemes used do not necessary need have one encryption scheme stronger than the other. For instance, two encryption schemes may be different, without one being stronger than the other (however, one may take less time to decrypt). As such, similar embodiments may be created that use a first encryption scheme and a second encryption scheme. Further, more than encryption schemes may be possible to be used, such as a light, medium, and heavy encryption scheme.

If greater than some number of television channels (e.g., 2) has its associated ECMs encrypted using heavy encryption, the smartcard may not be able (due to programmed limits or processing limits of the smartcard) to decrypt the ECMs fast enough for both television channels to be recorded and/or presented simultaneously. Synchronization may be coordinated by the television service provider. Accordingly, the smartcard may receive combinations of heavy encrypted ECMs and light encrypted ECMs that the smartcard is known to be able to decode sufficiently timely to permit simultaneous recording and/or presentation of the associated television channels.

Demultiplexer 255 may be configured to filter data packets based on PIDs. For example, if a transponder data stream includes multiple television channels, data packets corresponding to a television channel that is not desired to be stored or displayed by the user, may be ignored by demultiplexer 255. As such, only data packets corresponding to the one or more television channels desired to be stored and/or displayed may be passed to either descrambling engine 265 or smart card 260, other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to NIT 240, may be appropriately routed by demultiplexer 255.

Descrambling engine 265 may use the control words output by smart card 260 in order to descramble video and/or audio corresponding to television channels for storage and/or presentation. Video and/or audio data contained in the transponder data stream received by tuners 215 may be scrambled. The video and/or audio may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (via DVR 245) and/or to audio/video decoder 233 for output to a television or other presentation equipment via television interface 235.

For simplicity, STB 200 of FIG. 2 has been reduced to a block diagram, commonly known parts, such as a power supply, have been omitted. Further, some routing between the various modules of STB 200 has been illustrated. Such illustrations are for exemplary purposes only. Two modules not being directly or indirectly connected does not indicate the modules cannot communicate. Rather, connections between modules of the STB 200 are intended only to indicate possible common data routing. It should be understood that the modules of STB 200 may be combined into a fewer number of modules or divided into a greater number of modules. Further, the components of STB 200 may be part of another device, such as built into a television. Also, while STB 200 may be used to receive, store, and present television channels received via a satellite, it should be understood that similar components may be used to receive, store, and present television channels via a cable network.

Figure 3:
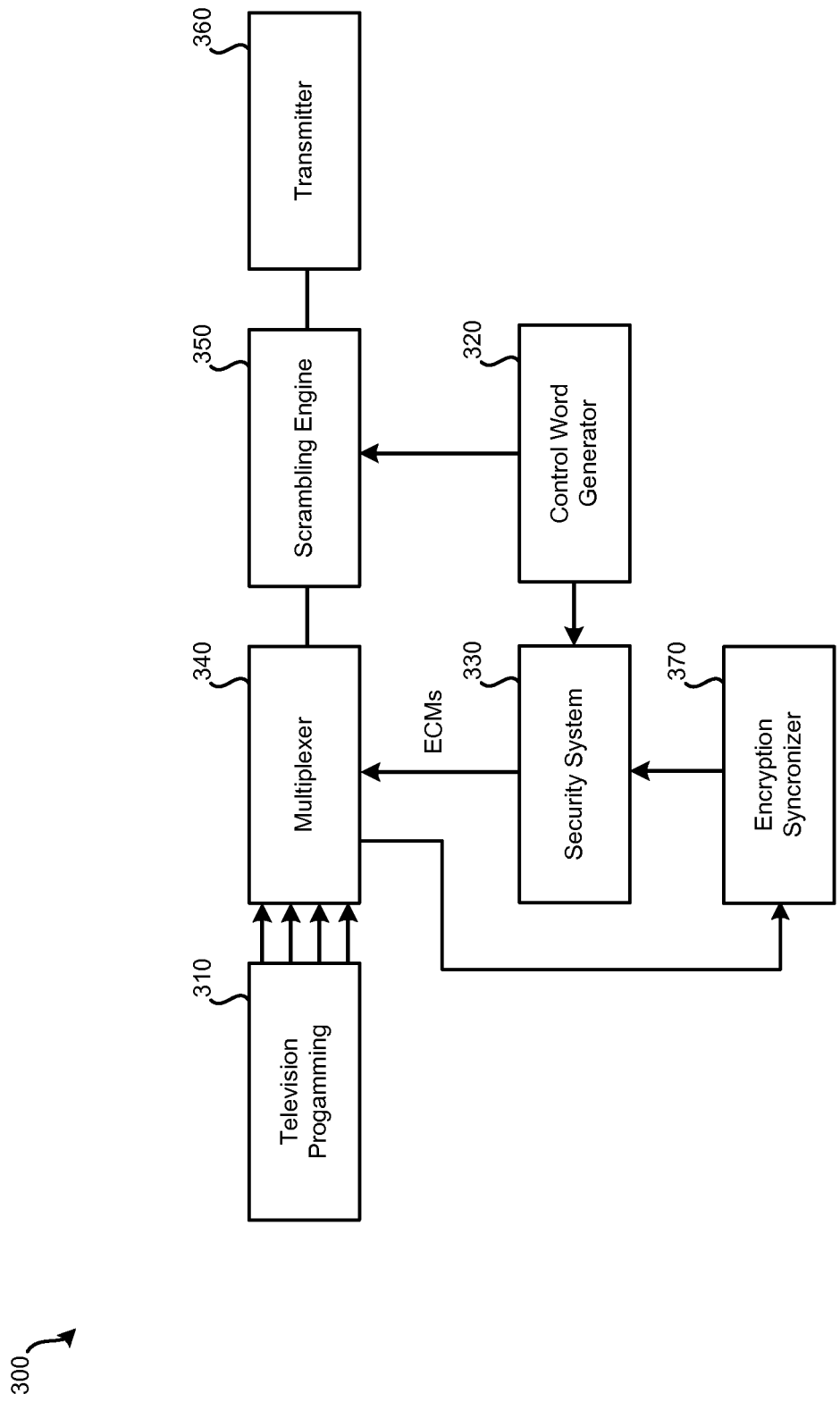
FIG. 3 illustrates an embodiment of a television service provider encryption system.

FIG. 3 illustrates an embodiment of a television service provider scrambling system 300. Television service provider scrambling system 300 may be part of television service provider system 110 of FIG. 1. As such, before data is transmitted to set-top boxes via satellite, television service provider scrambling system 300 may be used to scramble video and/or audio packets to prevent unauthorized users from accessing television programming. Television service provider scrambling system 300 may include: television programming module 310, control word generator 320, security system 330, multiplexer 340, scrambling engine 350, transmitter 360, and encryption synchronizer 370.

Television programming module 310 may receive television channels from multiple different sources, such as directly from the networks that produced the content on the television channels. Each television channel that is to be transmitted on a particular transponder stream via a transponder of the satellite may be provided to multiplexer 340. Multiplexer 340 may create a digital stream of data packets containing the video, audio, and other data, such as ECMs, to be transmitted on the transponder data stream. The data stream, which includes video and/or audio data packets that are not scrambled, may be passed to scrambling engine 350. Scrambling engine 350 may use a control word to scramble video or audio present in a data packet. Some audio and video packets may also pass through with no scrambling, if desired by the television service provider.

Control word generator 320 may generate the control word that is used by scrambling engine 350 to scramble the video or audio present in the data packet. Control words generated by control word generator 320 may be passed to security system 330, which may be operated by the television service provider or by a third-party security provider.

The control words generated by control word generator 320 may be used by security system 330 to generate an ECM. Each ECM may indicate two control words. The control words indicated may be the current control word being used to scramble video and audio, and the control word that will next be used to scramble video and audio. Whether an ECM is created for the two controls words using heavy or light encryption may be determined by encryption synchronizer 370.

Encryption synchronizer 370 may determine which television channels are to be encrypted using heavy or light encryption and may control how the heavy and light encryption is cycled through the channels. For instance, encryption synchronizer 370 may receive data from multiplexer 340 (or some other source, such as an administrator of the television service provider) that indicates which television channels are transmitted using the same transponder stream. In some embodiments, heavy encryption is rotated among television channels transmitted as part of the same transponder stream. Encryption synchronizer 370 may provide security system 330 with an indication of which television channels should be associated with a heavy encrypted ECM and which television channels should be associated with a light encrypted ECM. The designation may change periodically, such as every ten seconds.

As an example, if television channels 1, 2, 3, 4, and 5 are grouped together for transmission using a single transponder stream, multiplexer 340 may provide an indication of this group of television channels to encryption synchronizer 370, which may be operated by the television service provider or a third-party entity which may be operating security system 330. Based on the group of television channels and having an indication of the number of heavy encrypted ECMs (e.g., one) that a smartcard of a STB can handle over a given period, encryption synchronizer 370 may provide an indication to security system 330 of how ECMs should be encrypted, such as exemplified in Table 2.

TABLE 2

| Time (in seconds) | Television Channel 1 | Television Channel 2 | Television Channel 3 | Television Channel 4 | Television Channel 5 |
| --- | --- | --- | --- | --- | --- |
| 0 s-10 s | Heavy | Light | Light | Light | Light |
| 10 s-20 s | Light | Heavy | Light | Light | Light |
| 20 s-30 s | Light | Light | Heavy | Light | Light |

Since the processing capabilities of a television service provider's STBs' smartcards may be known, encryption synchronizer 370 may be configured such that a smartcard does not receive more heavy encrypted ECMs than the smartcard can handle for a given time period (such that when a particular CW is needed for descrambling by the STB, the CW has been decrypted from the ECM by the smartcard and is available for use).

Security system 330 may create and output an ECM to multiplexer 340 for transmission to subscribers' set-top boxes based on the encryption scheme indicated by encryption synchronizer 370 and the CWs indicated by control word generator 320. Each data packet, whether it contains audio, video, an ECM, or some other form of data, may be associated with a PID. PIDs may be used by the set-top box in combination with the networking information table to determine which television channel the data contained within the data packet corresponds. After video and audio contained within data packets has been scrambled by scrambling using a CW engine 350, the transponder data stream may be transmitted by transmitter 360 to a satellite, such as satellite 130-1 of FIG. 1, for relay to subscribers' set-top boxes, such as STB 150. Accordingly, the transponder data stream transmitted by transmitter 360 contains scrambled video packet stream and audio packet stream and also contains an encrypted ECM packet stream which, when decrypted, provides the control words necessary to descramble the scrambled video and audio packets.

For simplicity, television service provider scrambling system 300 of FIG. 3 has been reduced to a block diagram, other common components have been omitted. Further, some routing between the various modules of television service provider scrambling system 300 has been illustrated. Such illustration is for exemplary purposes only. Regardless of whether two modules are directly or indirectly connected, the modules may be able to communicate. Connections between modules are intended only to indicate possible common routing. It should be understood that the modules of television service provider scrambling system 300 may be combined into a fewer number of modules or divided into a greater number of modules.

Figure 4:
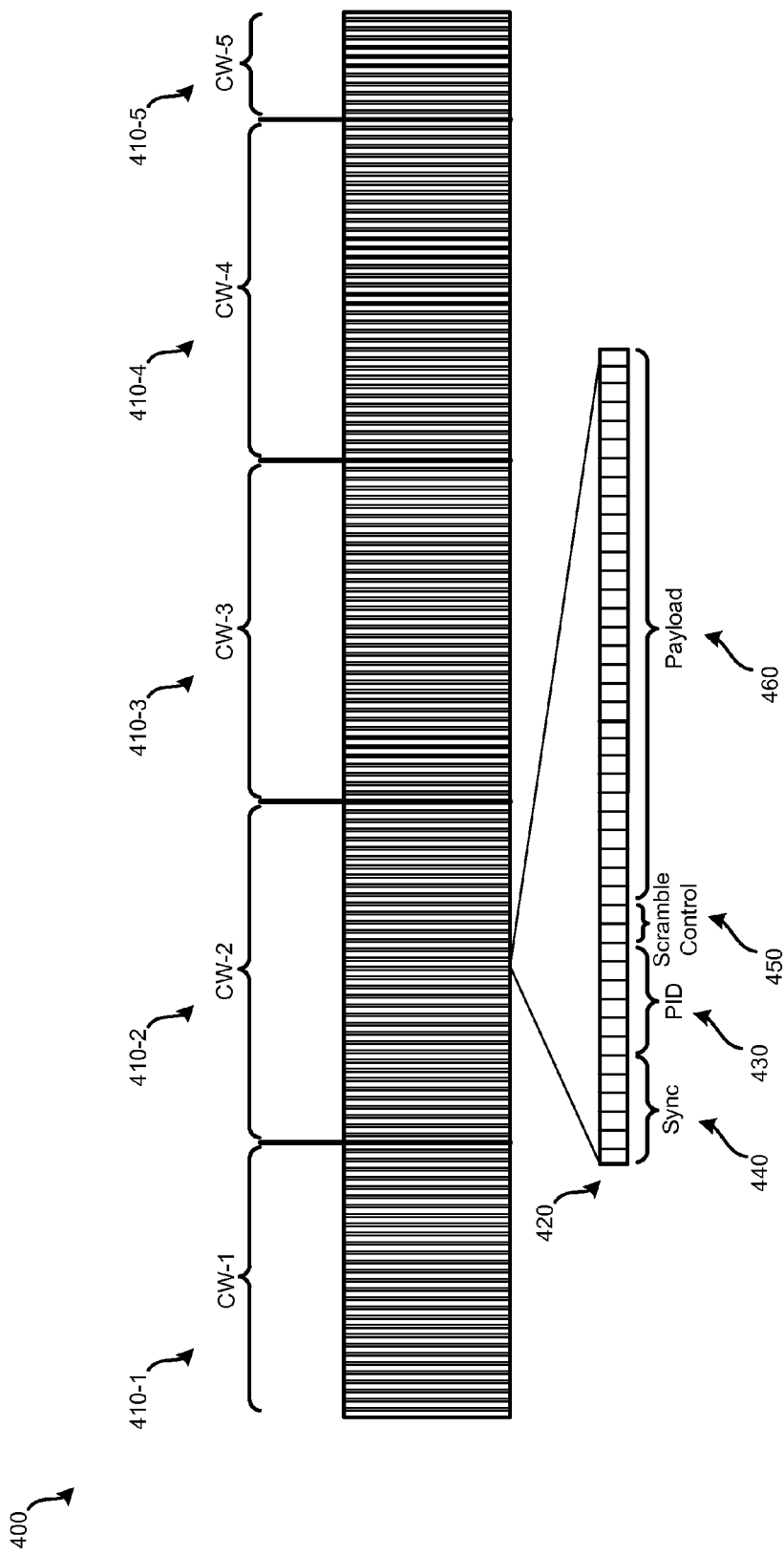
FIG. 4 illustrates an embodiment of a data transmission and encryption for satellite television channel distribution.

FIG. 4 illustrates an embodiment of a data transmission and encryption scheme for satellite television channel distribution. In FIG. 4, a transponder data stream 400 is illustrated. At least some data contained within data packets of transponder data stream 400 are scrambled using control words. In some embodiments, at least audio and video data contained within data packets are scrambled using control words. Referring to transponder data stream 400, video and audio packets transmitted during a first time period 410-1 are scrambled using a first control word. Video and audio transmitted during a second time period 410-2 is scrambled using a second control word. Video and audio transmitted during a third time period 410-3 is scrambled using a third control word, and so on. In order to descramble video and audio received during a particular time period, the appropriate control word must be used for descrambling.

Data packet 420 illustrates an exemplary video or audio packet. Data packet 420 may contain at least: PID 430, sync 440, scramble control 450, and payload 460. The packet header of the packet (which may be an MPEG packet) may include PID 430, sync 440, and scramble control 450. PID 430 may be a packet identifier used to indicate the particular television channel (or other type of data, such as an ECM) with which the data packet is associated. Multiple video packets associated with the same PID may be referred to as a video packet stream, likewise for ECMs and audio packets. Referring back to Table 1, if a particular television channel is attempting to be accessed, such as television channel four, using the NIT, the STB may be able to determine that a data packet with a PID of 1001 corresponds to audio for channel 4, a data packet with a PID of 1011 corresponds to video for channel 4, and a data packet with a PID of 27 corresponds to an ECM for channel 4. Sync 440 may contain some number of bits that are used to synchronize with the transport stream. Scramble control 450 may serve to indicate which control word, if any, should be used to descramble payload 440. In some embodiments, scramble control 450 may indicate either an even control word or an odd control word is to be used for decryption. In a video or audio packet, payload 460 may contain scrambled video or audio, respectively.

When a data packet is received that indicates a PID corresponding to an ECM of a television channel desired to be recorded or viewed, the encrypted ECM in the payload may be passed to a smart card for decryption. As the control word used for descrambling is changed over time, so is the ECM. Each ECM may contain the currently used control word for descrambling and the control word that will be used for descrambling next. As such, an ECM may contain one control word that is the same as the previous ECM and a new control word. For example, an ECM may be represented in the format of ($CW_{odd}$, $CW_{even}$). Whether the even or the odd control word is used for descrambling may be based on the scramble control identifier present within a data packet.

During the time period 410-1 the odd control word, $CW_1$, may be used for descrambling. During this time period, the same ECM may be received multiple times (which may allow a set-top box that just tuned to the transponder stream to access television channels using the ECM's CWs as soon the ECMs are decrypted and the CW recovered). This ECM may include encrypted ($CW_1$, $CW_2$). As such, the ECM indicates the current control word ($CW_1$) and the next control word to be used ($CW_2$). During time period 410-1 data packets containing scrambled data may have scramble control bits that indicate the odd control word should be used for descrambling, as such $CW_1$ may be used for descrambling.

Starting at the beginning of time period 410-2, the scramble control bits of a data packet containing scrambled video or audio may indicate the even control word should be used, as such $CW_2$ may be used for descrambling. Once time period 410-2 begins, and control word $CW_1$ is no longer being used for descrambling, a different ECM may be transmitted to the STB that indicates the current control word and the next control word to be used. This ECM may be transmitted periodically during time period 410-2, such as every tenth of a second. In this instance, the ECM may indicate: ($CW_3$, $CW_2$). As such, the current control word $CW_2$ remains the same and continues to be used for descrambling during time period 410-2 during which the data packets indicate, via their scramble control bits, that the even control word is to be used for descrambling. When decrypted, the new ECM indicates a new odd control word, $CW_3$, which will be used for descrambling when the scramble control bits indicate the odd control word should be used for descrambling. This process may continue, with descrambling switching between the even and odd control words as long as the STB is tuned to the transponder stream. In some embodiments, the time period during which any particular control word is used may be approximately 10 seconds. Such a time period may allow ample time for a smartcard to decrypt an ECM such that the next control word to be used will be decrypted by the smart card prior to data packets being received that indicate, via the scramble control bits, that this next control word is to be used for descrambling.

Transponder data stream 400 may contain audio and video for multiple television channels, the packets of which may be indicated by different PIDs. In FIG. 4, a single CW is shown as used for discrete time periods, however it should be understood that different CWs may be decrypted from different ECMs for different television channels. As such, the illustration of CWs one through five may be for one (or more than one) television channel, while other CWs (decrypted from other ECMs) may be used for other television channels within the transponder stream.

While data packet 420 indicates only PID 430, sync 440, scramble control 450, and payload 460 as parameters that are present, it should be understood that data may be present that corresponds to other parameters, such as other header parameters. Further, based on the embodiment, the number of bits or bytes present in scramble control 450, payload 460, PID 430, sync 440 and/or any other parameter may vary. The boxes present in data packet 420 are not intended to be representative of a particular number of bits or bytes.

Figure 5:
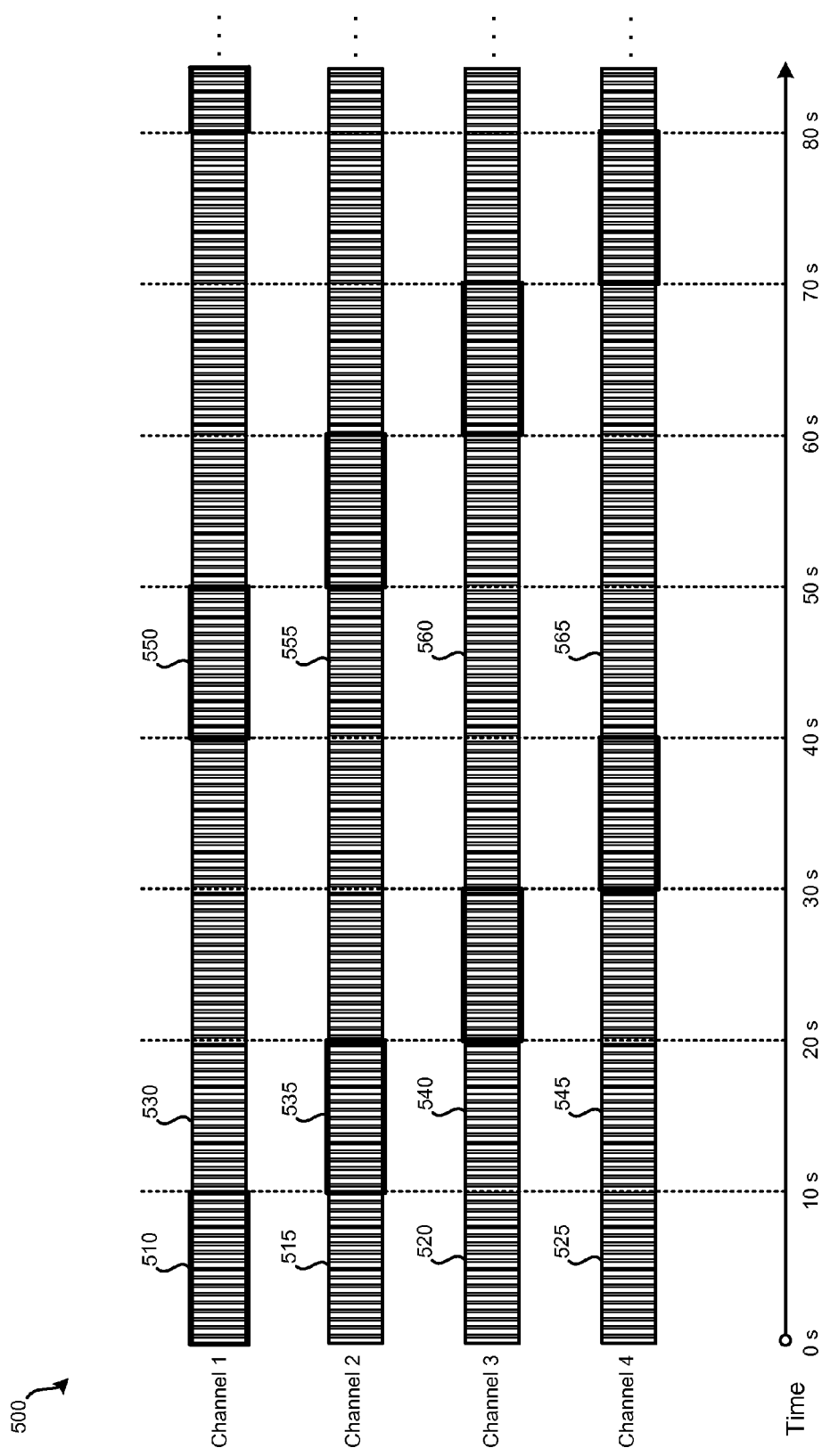
FIG. 5 illustrates an embodiment of multiple encryption schemes corresponding to multiple television channels.

FIG. 5 illustrates an embodiment of multiple encryption schemes of ECMs 500 corresponding to multiple television channels. While transponder stream 400 of FIG. 4 represents all of the data packets received via a transponder stream, FIG. 5 illustrates audio and video packets sorted according to television channel. As such, each of television channels one through four may have been received as part of the same transponder stream or in a different transponder streams. Television channels one through four may have been received as part of transponder stream 400. The multiple encryption schemes of ECMs 500 may be determined by security system 330, control word generator 320, and encryption synchronizer 370 of the television service provider that scrambles the television channels and encrypts the ECMs prior to transmitting each to users' set top boxes.

In FIG. 5, The multiple encryption schemes of ECMs 500 are illustrated in the time domain. Audio/video data packet group 510 may be received by a set top box between 0 seconds and 10 seconds. During this same time period, audio/video data packet groups 515, 520, and 525 may also be received by the set top box. If received as part of the same transponder stream, each of these packets may be received at slightly different times within the time period between 0 and 10 seconds. To decode some or all of these groups of audio/video data packets, ECMs received by a set top box may need to be decrypted to obtain the control words necessary to descramble the audio/video packets associated with each television channel. Received within audio/video data packet group 510 (or at some earlier time) may be one or more ECMs corresponding to television channel one. Received among audio/video data packet group 515 (or at some earlier time) may be one or more ECMs corresponding to television channel two. Received among audio/video data packets 520 (or at some earlier time) may be one or more ECMs corresponding to television channel three. Received among audio/video data packets 520 (or at some earlier time) may be one or more ECMs corresponding to television channel four. In order for a particular television channel to be presented (such as via a television) and/or recorded (such as via a DVR), the television channel's audio/video data packets may need to be descrambled using a control word obtained from an ECM corresponding to the television channel.

Each ECM received by the STB may be encrypted. While each ECM may be encrypted, the encryption scheme for one or more of the ECMs may vary. In FIG. 5, audio/video data packet groups required to be descrambled using a control word obtained from a heavy encrypted ECM are bolded. Therefore, audio/video data packet group 510 requires a control word obtained from a heavy encrypted ECM for descrambling. The remaining television channels during the same time period may use a different encryption scheme. Audio/video data packet groups 515, 520, and 525 each use light encryption during this time period of 0 to 10 seconds. Therefore, during the time period of 0 seconds to 10 seconds, only television channel one has video/audio data packets requiring a control word for descrambling from a heavy encrypted ECM; television channels two, three, and four have audio/video data packets requiring control words from light encrypted ECMs. Therefore, in order to obtain the control words necessary to descramble channels one through four over the time period of 0 seconds to 10 seconds, a smartcard of a set top box may only need to decrypt a single heavy encrypted ECM and three light encrypted ECMs.

During the time period of 10 seconds to 20 seconds, which television channel requires a control word from a heavy encrypted ECM has rotated. Audio/video data packet groups 530, 540, and 545 each are descrambled using control words obtained from light encrypted ECMs. Audio/video data packets from audio/video data packet group 535 are descrambled using a control word decrypted from a heavy encrypted ECM. Accordingly, for the time period of 10 seconds to 20 seconds, a smartcard of a set top box is again only required to decrypt a single heavy encrypted ECM and three light encrypted ECMs, albeit during this time period the television channel descrambled using a control word decrypted from a heavy encrypted ECM has changed. This pattern may continue for additional audio/video data packet groups later in time such that audio/video data packet groups for television channel three and television channel four are also associated with an ECM encrypted using heavy encryption. In the illustrated embodiment, at 40 seconds, after each of the television channels have been associated with an ECM encrypted using heavy encryption, audio/video data packets associated with channel one may again need to be descrambled using a control word obtained from a heavy encrypted ECM. As such, audio/video data packet group 550 may require a control word be obtained from a heavy encrypted ECM, while audio/video data packet groups 555, 560, and 565 require control words from light encrypted ECMs for descrambling. Regardless of whether control words are obtained from a heavy or light encrypted ECM, the descrambling process using the CWs may remain the same across the television channels.

Each of television channels one through four may be transmitted using a single transponder stream. As such, if a set top box has been configured to present and/or store some or all of the television channels transmitted using a particular transponder stream, encryption of the ECMs for each television channel can be synchronized such that the STB's smartcard has only a limited number of heavy encrypted ECMs to decrypt for a given time period (such as one every ten seconds). As such, it can be ensured that a smartcard receives ECMs than can be decrypted to obtain the CWs in time for descrambling of the associated television channels.

In the illustrated embodiment of FIG. 5, four television channels are presented with a heavy encrypted ECM being associated with each television channel in sequence; this arrangement is for example purposes only. The number of television channels through which heavy/light encryption cycling may occur can vary. For instance, the heavy/light encryption may cycle through each television channel in a particular transponder stream. Further, the cycling may not need to be in a sequential manner, which is illustrated. Also, the time period after which cycling occurs may vary by embodiment (e.g., cycle every 30 seconds instead of every 10 seconds). The number of television channels that can be concurrently associated with heavy encryption may vary. For instance, this may be based on the capabilities of a smartcard in the set top boxes. In some embodiments, one, two, three, or more television channels may be associated with a heavy encrypted ECM and may be decrypted by a smartcard in a sufficiently timely manner to permit the control words to be obtained for descrambling of audio and video data packets.

Figure 6:
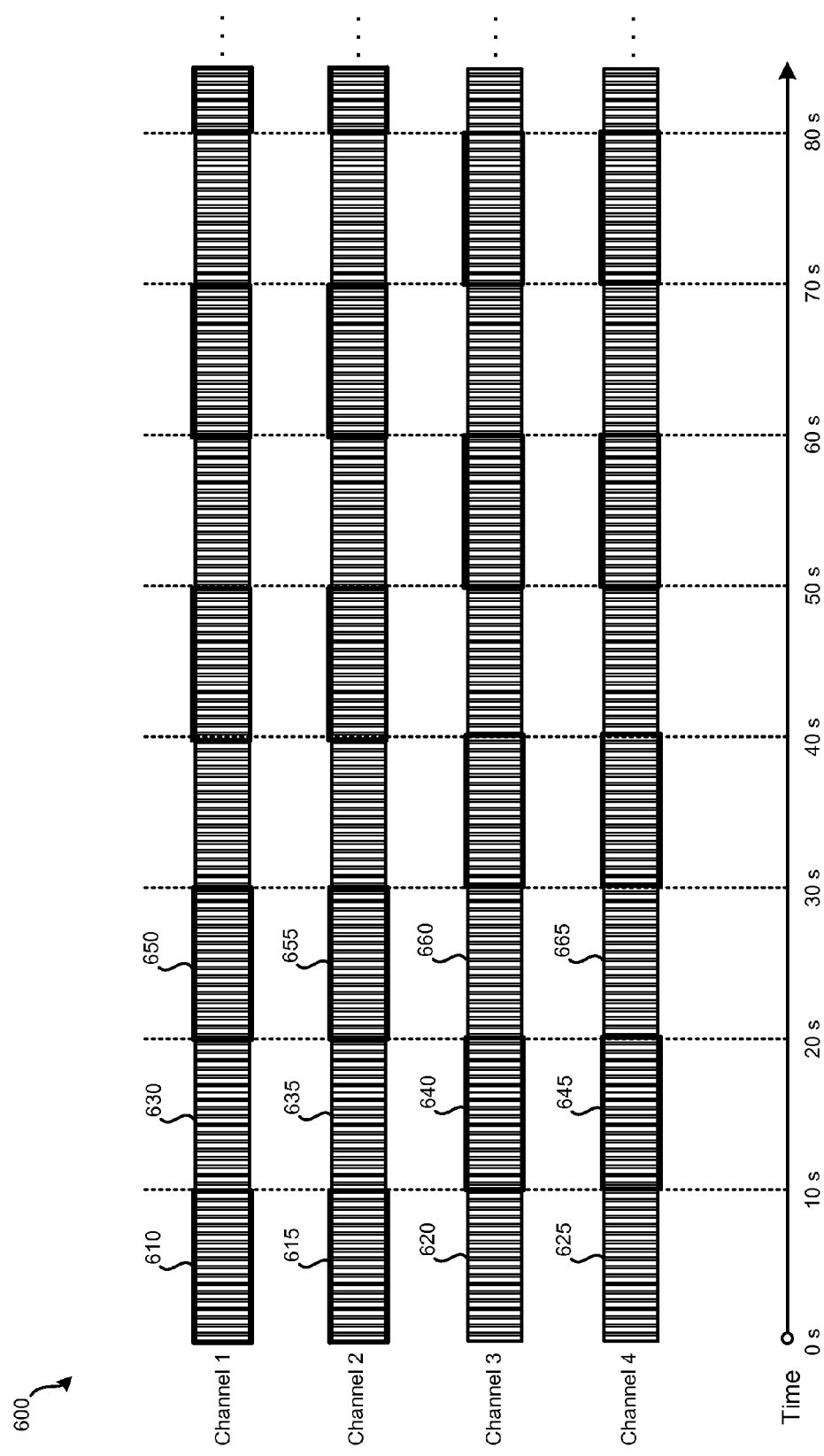
FIG. 6 illustrates another embodiment of multiple encryption schemes corresponding to multiple television channels.

FIG. 6 illustrates another embodiment of multiple encryption schemes of ECMs 600 corresponding to multiple television channels. While transponder stream 400 of FIG. 4 represents all of the data packets received via a transponder stream, FIG. 6, like FIG. 5, illustrates audio and video packets sorted (for visualization purposes) according to television channel. As such, each of television channels one through four in FIG. 6 may have been received as part of the same transponder stream or in a different transponder streams. Television channels one through four may have been received as part of transponder stream 400. The multiple encryption schemes of ECMs 600 may be designated by security system 330, control word generator 320, and encryption synchronizer 370 of the television service provider that scrambles the television channels and encrypts the ECMs prior to transmitting each to users' set top boxes. The multiple encryption schemes of ECMs 600 may represent an alternate embodiment to multiple encryption schemes of ECMs 500 of FIG. 5.

In multiple encryption schemes of ECMs 500 of FIG. 5, out of a group of four television channels, heavy and light encryption was cycled for each television channel individually. In some embodiments, the same ECM, whether encrypted using heavy or light encryption, may be used to obtain CWs for descrambling of more than one television channel. For example, referring to Table 1, it may be possible to assign multiple television channels the same ECM PID (for example, television channels 4 and 5 could each be assigned an ECM PID of 27). Therefore, ECMs with the same PIDs would be used to obtain the CWs for each television channel. In the multiple encryption schemes of ECMs 600, two television channels are assigned to each ECM. Television channel one and two correspond to a first ECM PID and television channels three and four correspond to a second ECM PID. Therefore, rather than four ECMs needing to be decrypted for each time period (in this example, 10 seconds), only two ECMs need to be decrypted for each time period.

In FIG. 6, The multiple encryption schemes of ECMs 600 are illustrated in the time domain. Audio/video data packet group 610 may be received by a set top box between 0 seconds and 10 seconds. During this same time period, audio/video data packet groups 615, 620, and 625 may also be received by the set top box. The audio and video packets for each television channel may be distinguished by different PIDs, such as presented in Table 1. However, the control words used to scramble each television channel may match between channels one and two and between channels three and four such that one ECM may be decrypted to obtain the control word for channels one and two, and one ECM may be decrypted to obtain the control word for channels three and four. Each data packet may be received at slightly different times within the time period between 0 and 10 seconds. Interspersed within the transponder stream may be one or more ECMs corresponding to television channels one and two. Interspersed within the transponder stream may be one or more ECMs corresponding to television channels three and four. Based on PIDs in the NIT (or some other locally-stored table), the STB may determine that an ECM stream associated with a particular PID is associated with multiple television channels. In order for a particular television channel to be presented (such as via a television) and/or recorded (such as via a DVR), the television channel's audio/video data packets may need to be descrambled using a control word obtained from an ECM corresponding to the television channel.

As in FIG. 5, audio/video data packets associated with CWs obtained from a heavy encrypted ECM are bolded. As such, audio/video data packet groups 610 and 615 require a control word for descrambling from a heavy encrypted ECM; audio/video data packet groups 620 and 625 require a control word for descrambling from a light encrypted ECM. Since multiple television channels share ECMs, for the time period of 0 s-10 s, only two ECMs may need to be decrypted. Other embodiments may use variations on the theme of using a same ECM for multiple television channels. For instance, television channels one, two, and three may use the same ECM stream, while television channel four uses a different ECM stream.

For the time period of 10 s-20 s, the encryption scheme may rotate such that the ECM used to obtain the control words for audio/video data packet groups 640 and 645 is heavy encrypted, while the ECM used to obtain the control words for audio/video data packet groups 630 and 635 is light encrypted. For time period of 20 s-30 s, the encryption may rotate back to the same arrangement as the first time period. As such, the ECM used to obtain the control words for audio/video data packet groups 650 and 655 are heavy encrypted, while the ECM used to obtain the control words for audio/video data packet groups 660 and 665 are light encrypted. In such an embodiment, each television channel is protected by a heavy encrypted ECM for 50% of the time. However, the smartcard of the STB may have to perform less overall processing because only two ECMs are needed for the four television channels. In some embodiments, because fewer ECMs need to be decrypted, a heavier level of encryption may be used for each ECM (which may take the smartcard of a STB longer to decrypt). Such an arrangement may be preferable because it may be more difficult for a non-subscriber to crack a heavier encrypted ECM used for multiple television channels rather than a lighter encrypted ECM used for a fewer (e.g., one) television channels.

From the embodiments of FIGS. 5 and 6, it may be possible to determine other encryption schemes that can be used over multiple television channels which may be transmitted as part of the same transponder stream. While the above description focuses on heavy and light encryption, such embodiments may be applied more generally to a first and second encryption scheme. As such, rather than one encryption scheme being more difficult to decrypt, different encryption methods may be present for each encryption scheme. The number of television channels and the length of the time periods used are for example purposes only. Further, in some embodiments, more than two encryption schemes may be used to encrypt ECMs.

Figure 7:
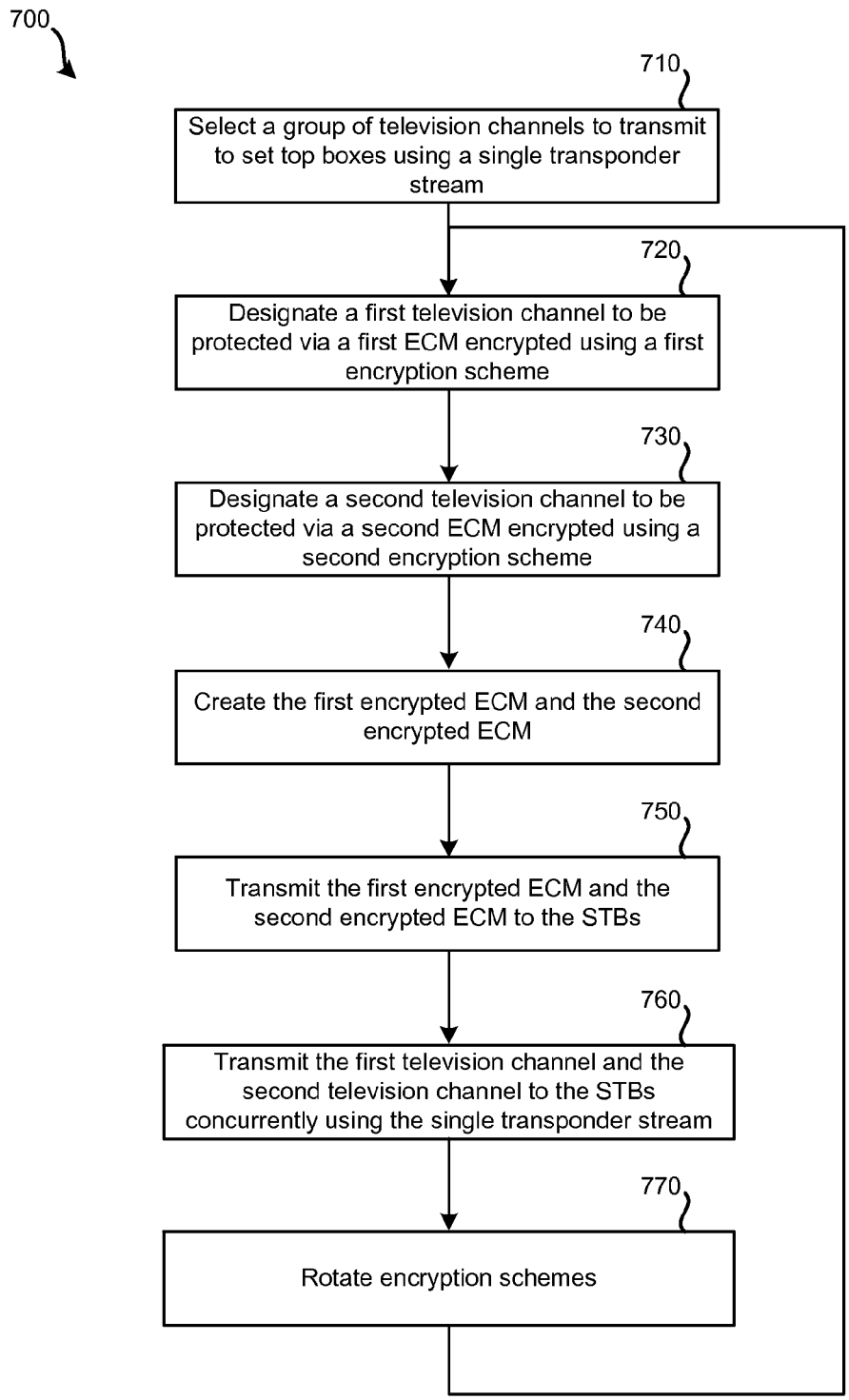
FIG. 7 illustrates an embodiment of a method for using multiple encryption schemes for encryption of entitlement control messages (ECMs) within a single transponder stream.

The various encryption schemes and systems described herein may be used to perform various methods. FIG. 7 illustrates an embodiment of a method 700 for using multiple encryption schemes for encryption of entitlement control messages (ECMs) within a transponder stream. Method 700 may be performed by a television service provider system for transmitting television channels to STBs via satellite, such as presented in system 100 of FIG. 1. Method 700 may also be applied to a cable television distribution system. At least some steps of method 700 may be performed using a computer system. Television service provider system 300 of FIG. 3 may be used to perform at least some of the steps of method 700. As such, means for performing method 700 can include one or more computers and/or any of the components of systems 100, 200, and/or 300.

At step 710, a group of television channels may be selected to transmit to multiple STBs using a single transponder stream. By using a single transponder stream, it may be possible to use a single tuner at a set top box to receive each of the television channels. In a satellite-based television distribution system, groups of television channels may be transmitted to user equipment via multiple transponders which may be located on one or more satellites. The television channels may be grouped into particular transponder streams based on television channels that a subscriber may be likely to want to watch and/or record at the same time. As such, the amount of hardware necessary at the set top box may be minimized by having such television channels transmitted in the same transponder stream.

At step 720, within the group of television channels selected at step 710, a first television channel may be designated to be protected via a first ECM that is encrypted using a first encryption scheme. For example, this first encryption scheme may be heavy encryption which takes longer to decrypt by a set top box than an ECM encrypted using light encryption. At step 730, within the group of television channels selected it step 710, a second television channel may be designated to be protected via a second ECM that is encrypted using a second encryption scheme. As an example, if the group of television channels selected at step 710 includes 6 television channels, one of the television channels may be selected to be protected using an ECM encrypted using a first encryption scheme while the other five television channels are protected using ECMs that are encrypted using a second encryption scheme. This second encryption scheme may be a light encryption scheme which takes less time and/or less processing to decrypt that an ECM encrypted using heavy encryption. As a simple example, the heavy encryption may be 128-bit encryption while the light encryption may be 64-bit encryption. The designations of steps 720 and 730 may be for predefined period of time after which encryption may rotate such that the television channels are protected using other encryption schemes.

At step 740, the first encrypted ECM and the second encrypted ECM may be created. The first encrypted ECM may be created in accordance with the first encryption scheme and the second encrypted ECM may be created in accordance with the second encryption scheme. Each encrypted ECM may be created to contain control words that are provided to the component creating the ECMs. An indication may also be provided to the component creating the ECMs as to which encryption scheme should be used to encrypt the ECM. In some embodiments, each ECM contains two control words. Referring to FIG. 3, security system 330 may be used to create the ECMs. Security system 330 may be operated by the television service provider or by a third-party provider. The television service provider or the third-party provider may operate a control word generator that creates the control words which are used to scramble the television channels. These control words along with input from encryption synchronizer, which may specify the encryption scheme to be used to encrypt the control words may be used by the security system to create the ECMs encrypted using the first and second encryption schemes.

At step 750, the first encrypted ECM and a second encrypted ECM may be transmitted to the multiple set top boxes. Referring to FIG. 1, a satellite television distribution system may be used to transmit the first and second ECMs to multiple set top boxes. The first and second encrypted ECMs may be transmitted to set top boxes in a transponder stream containing data packets associated with audio and video for television channels. Such a transponder stream may also include data used to update a table stored at the set top box and/or provide other services to subscribers.

At step 760, audio and video packets corresponding to the first television channel and the second television channel may be transmitted to the set top boxes possibly using the single transponder stream. Over a given time period, such as a period of 10 seconds, audio and video data packets corresponding to each television channel may be transmitted as part of the transponder stream. Over this time period, the set top box may have the ability to record and/or present either television channel. As such, the first television channel and second television channel are considered to be concurrently transmitted and concurrently received. For example, over the same time period, such as from 8 PM to 8:30 PM, either television channel may be tuned to for different television programs. The first television channel may be scrambled using one or more control words encrypted in the first ECM. The second television channel may be scrambled using one or more control words encrypted in the second ECM. Accordingly, in order to descramble the first and second television channels, the ECM encrypted using the first encryption scheme and the second ECM encrypted using the second encryption scheme may need to be decrypted by a set top box. Such decryption may be performed by the smart card at the set top box. By using two different encryption schemes, the amount of processing necessary to be performed at the set top box may be decreased. Such a decrease in processing may permit control words to be obtained from the ECMs in time to permit descrambling of the corresponding television channels when the control words have started being used to scramble the television channels.

At step 770, the encryption schemes may be rotated. Rotating the encryption schemes may involve ECMs that were previously encrypted using the first encryption scheme now being encrypted using the second encryption scheme. Similarly, ECMs that were previously encrypted using the second encryption scheme may now be encrypted using the first encryption scheme. Therefore, when method 700 repeats, at step 720, the second encryption scheme may be used and at step 730 the first encryption scheme may be used. Such rotation may allow each television channel at different periods of time to be encrypted using each encryption scheme. It may not be necessary for the television service provider to provide any indication of which encryption scheme is used for which ECM to a STB. Based on the properties of the ECM, a smartcard of a set top box may be able to determine the processing necessary to decrypt the ECM.

Figure 8:
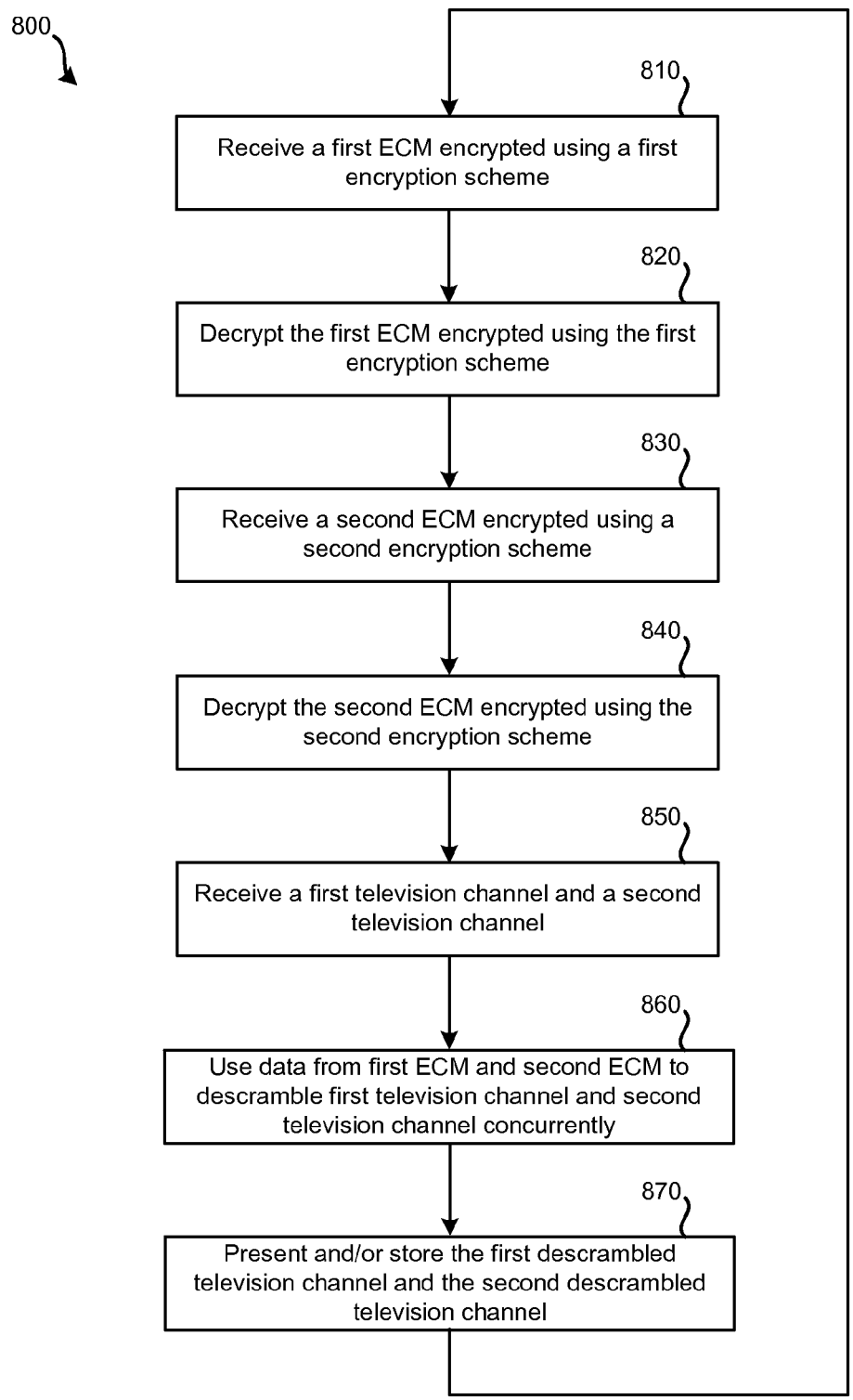
FIG. 8 illustrates an embodiment of a method for receiving multiple television channels corresponding to ECMs encrypted using multiple encryption schemes within a single transponder stream.

FIG. 8 illustrates an embodiment of a method for receiving multiple television channels corresponding to ECMs encrypted using multiple encryption schemes within a single transponder stream. Method 800 may be performed by a set top box that receives television channels via a satellite dish and satellite, such as presented in system 100 of FIG. 1. Method 800 may also be applied to a cable television distribution system, such as via a STB that receives RF cable television service. At least some steps of method 800 may be performed using a computer system. STB 200 of FIG. 2 may be used to perform at least some of the steps of method 800. As such, means for performing method 800 can include one or more computers and/or any of the components of systems 100, 200, and/or 300. Method 800 may be performed by a set top box following method 700 being performed by a television service provider.

At step 810, a first ECM encrypted using a first encryption scheme may be received by a set top box. The first encrypted ECM may contain an unencrypted PID. Based on this period, the set top box may determine whether the first encrypted ECM is associated with a television channel that is being presented and/or stored. If the television channel is not being presented or stored, the first encrypted ECM may be ignored. However, if the first encrypted ECM is associated with a television channel that is being output for presentation (e.g., via a television) and/or stored by the set top box, the first encrypted ECM may be routed within the set top box for decryption. The first encrypted ECM may be routed to a smartcard within the set top box for decryption. For the example of method 800, it is assumed that the first encrypted ECM is associated with a television channel that is being output for presentation and/or recorded by the set top box. The first encrypted ECM may be received as part of a transponder stream that contains multiple television channels that were grouped together into a single transponder stream by the television service provider.

At step 820, the first encrypted ECM may be decrypted by the set top box. The decryption may be performed by a smartcard at the set top box. As such, the first encrypted ECM may be routed within the set top box to the smartcard for decryption. When the first encrypted ECM is received by the smart card, the smartcard may process the first encrypted ECM until it is decrypted. Once successfully decrypted, two control words may be obtained from the first encrypted ECM. The smartcard may be able to determine the proper way to decrypt the first encrypted ECM regardless of whether the ECM is encrypted using the first or second encryption scheme. For instance, based on the number of bits received, the smartcard may be able to determine the proper way to decrypt the first encrypted ECM. The smartcard may continue processing the first encrypted ECM until it has been successfully decrypted. The amount of time the smartcard requires to successfully decrypt the first encrypted ECM may be based on the encryption scheme used for encryption of the first ECM.

At step 830, a second ECM encrypted using a second encryption scheme may be received by the set top box. This second encrypted ECM may be associated with one or more television channels other than the one or more television channels associated with the first encrypted ECM. The first encrypted ECM and the second encrypted ECM may be received as part of the same transponder stream. The first encrypted ECM and the second encrypted ECM may correspond to different television channels transmitted and received via the same transponder stream.

The second encrypted ECM may contain an unencrypted PID. Based on this PID, the set top box may determine whether the second encrypted ECM is associated with a television channel that is being presented and/or stored. If the television channel is not being presented or stored, the second encrypted ECM may be ignored. However, if the second encrypted ECM is associated with the television channel that is being output for presentation (e.g., via a television) and/or stored by the set top box, the second encrypted ECM may be routed within the set top box for decryption. The second encrypted ECM may be routed to the smartcard within the set top box for decryption. For the example of method 800, it is assumed that, like the first encrypted ECM, the second encrypted ECM is associated with one or more television channels that are being output for presentation and/or recorded by the set top box. The second encrypted ECM may be received as part of the transponder stream that contains multiple television channels that were grouped together into a single transponder stream by the television service provider, including the first television channel.

At step 840, the second encrypted ECM may be decrypted by the set top box. The decryption may be performed by the smartcard at the set top box. As such, the second encrypted ECM may be routed within the set top box to the smartcard for decryption. When the second encrypted ECM is received by the smart card, the smartcard may process the second encrypted ECM until it is decrypted. Once successfully decrypted, two control words may be obtained from the second encrypted ECM for use in descrambling a second television channel. The smartcard may be able to determine the proper way to decrypt the second encrypted ECM regardless of whether the ECM is encrypted using the first or second encryption scheme. The smartcard may process the second encrypted ECM until it has been successfully decrypted. The amount of time the smartcard requires to successfully decrypt the second encrypted ECM may be based on the encryption scheme used for encryption of the second ECM. For example, if the second encryption scheme is a light encryption scheme while the first encryption scheme is a heavy encryption scheme, the second encrypted ECM may take less time for the smartcard to decrypt than the first encrypted ECM.

At step 850, audio and video packets corresponding to the first television channel and the second television channel may be received. Based on a locally stored network information table that identifies the associated ECM PID and the scramble control bits of the audio and video packets, the proper control words decrypted from the first encrypted ECM and the second encrypted ECM may be determined for use in descrambling the audio and video data packets. For the first television channel and a second television channel to be properly output for presentation and/or recorded by the set top box, it may be necessary for the appropriate control words to have been decrypted from the ECMs for use in descrambling. As such, when the television channel is being presented or recorded, the smartcard may be required to successfully decrypt the associated ECM to obtain the necessary control word for descrambling prior to the STB processing audio and/or video packets scrambled using that control word. To ensure that the smartcard decrypts all necessary ECMs prior to the control words contained in the ECMs being needed, the encryption schemes used for encryption of the ECMs may be synchronized by the television service provider such that the smartcard will have sufficient time to decrypt each necessary ECM. This may occur on a transponder stream by transponder stream basis, meaning, it may be assured that a smartcard can decrypt the ECMs for all television channels in a particular transponder stream in a timely manner.

At step 860, the control words from the first ECM and the second ECM may be used to descramble the first television channel and the second television channel concurrently. As such, television programs broadcast simultaneously on the two television channels may both be output for presentation and/or recorded by the set top box. Once the control words have been obtained from the first ECM and the second ECM, regardless of the encryption scheme used for each ECM, the scrambling may be performed using the control words obtained in the same manner. At step 870, the descrambled first television channel and the descrambled second television channel may be output for presentation and/or stored by the set top box. Following step 870, after a period of time, such as 10 seconds, new ECMs may need to be decrypted to obtain new control words for descrambling of the television channels. As such, method 800 may repeat the encryption scheme for each ECM may change.

It should be understood that while method 800 is directed to two television channels and encryption schemes, other embodiments of method 800 may involve more than two encryption schemes and/or more than two television channels. Further, a single ECM, based on its PID, may be associated with more than one television channel. For example, referring to FIG. 6, multiple channels can be associated with a common ECM. In some embodiments, ECMs associated with different television channels may be encrypted using the same encryption scheme. For instance, referring to FIG. 5, at a given time, one television channel may be associated with an ECM encrypted using a first encryption scheme while three other television channels in the same transponder stream may be associated with ECMs encrypted using a second encryption scheme.

Figure 9:
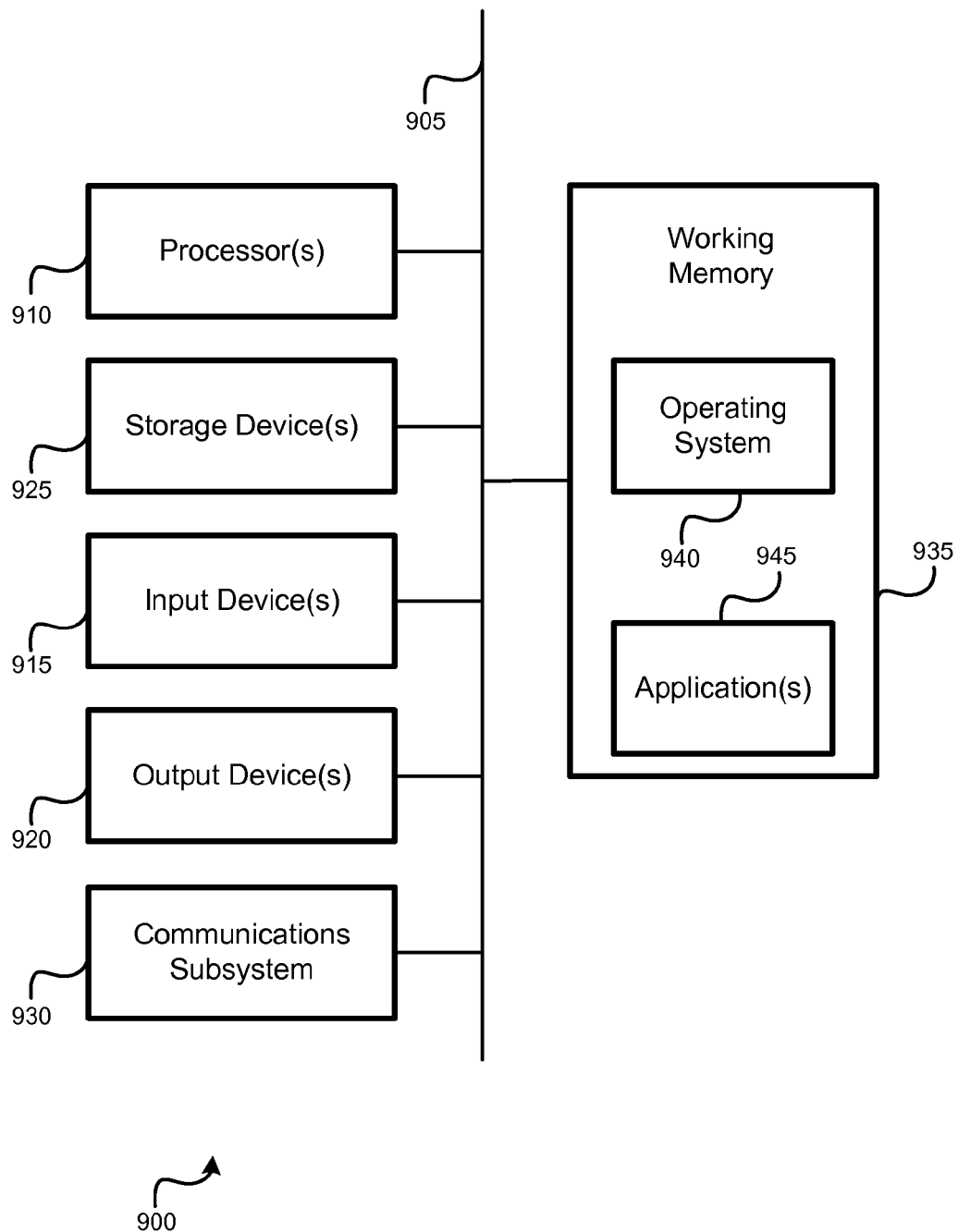
FIG. 9 illustrates an embodiment of a computer system.

FIG. 9 illustrates an embodiment of a computer system. A computer system as illustrated in FIG. 9 may be incorporated as part of the previously described computerized devices, such as the television service provider system and the set top boxes. Set top boxes may be combined with other systems, such as being subsystem of a television. FIG. 9 provides a schematic illustration of one embodiment of a computer system 900 that can perform the methods provided by various other embodiments, as described herein. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should further be understood that the components of computer system 900 can be distributed across a network. For example, some processing may be performed in one location using a first processor while other processing may be performed by another processor remote from the first processor. Other components of computer system 900 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A system for encrypting multiple television channels, the system comprising: one or more processors; and a memory communicatively coupled with and readable by the one or more processors and having stored therein processor-readable instructions which, when executed by the one or more processors, cause the one or more processors to: designate a first television channel of a plurality of television channels to be protected via a first entitlement control message using a first encryption scheme, wherein the plurality of television channels are transmitted using a single transponder stream; designate a second television channel of the plurality of television channels to be protected via a second entitlement control message encrypted using a second encryption scheme while the first television channel of the plurality of television channels is protected using the first encryption scheme; and
cause the first entitlement control message encrypted using the first encryption scheme and a second entitlement control message encrypted using the second encryption scheme to be transmitted to a plurality of television receivers, wherein: data from the first entitlement control message is used for descrambling of the first television channel by the plurality of television receivers, and data from the second entitlement control message is used for descrambling of the second television channel by the plurality of television receivers; wherein the processor-readable instructions, when executed by the one or more processors, cause the one or more processors to:
after the television service provider has transmitted the first entitlement control message and the second entitlement control message: designate the first television channel of the plurality of television channels to be protected via a third entitlement control message encrypted using the second encryption scheme; designate the second television channel of the plurality of television channels to be protected via a fourth entitlement control message encrypted using the first encryption scheme while the first television channel of the plurality of television channels is protected using the second encryption scheme; and cause the third entitlement control message encrypted using the second encryption scheme and the fourth entitlement control message encrypted using the first encryption scheme to be transmitted, wherein: the third entitlement control message is used for decryption of the first television channel, and the fourth entitlement control message is used for decryption of the second television channel.

2. The system for encrypting multiple television channels using multiple encryption schemes of claim 1, wherein
the first entitlement control message encrypted using the first encryption scheme requires more processing by a television receiver of the plurality of television receivers to decrypt than the second entitlement control message encrypted using the second encryption scheme.

3. The system for encrypting multiple television channels using multiple encryption schemes of claim 1, wherein the processor-readable instructions, when executed by the one or more processors, cause the one or more processors to:
cause the plurality of channels to be transmitted concurrently to a plurality of television receivers using the single transponder stream, wherein:
data from the first entitlement control message is required to descramble the first television channel; and
data from the second entitlement control message is required to concurrently descramble the second television channel during a time period the first television channel is being descrambled.

4. The system for encrypting multiple television channels using multiple encryption schemes of claim 1, wherein:
at a given time, only one television channel of the plurality of television channels transmitted concurrently using the single transponder stream is protected using the first encryption scheme.

5. The system for encrypting multiple television channels using multiple encryption schemes of claim 1, further comprising:
a television receiver comprising a smartcard, the television receiver configured to:
decrypt the first entitlement control message, wherein the television receiver is of the plurality of television receivers;
decrypt the second entitlement control message; and
descramble the first television channel using data from the first entitlement control message; and
descramble the second television channel using data from the second entitlement control message concurrently while descrambling the first television channel using data from the first entitlement control message.

6. The system for encrypting multiple television channels using multiple encryption schemes of claim 5, wherein:
the television receiver being configured to decrypt the first entitlement control message takes a longer period of time to process than decrypting the second entitlement control message.

7. A method for encrypting multiple television channels, the method comprising: designating, by the television service provider system, a first television channel of a plurality of television channels to be protected via a first entitlement control message using a first encryption scheme, wherein the plurality of television channels are transmitted using a single transponder stream; designating, by the television service provider system, a second television channel of the plurality of television channels to be protected via a second entitlement control message encrypted using a second encryption scheme while the first television channel of the plurality of television channels is protected using the first encryption scheme; and transmitting, by the television service provider system, the first entitlement control message encrypted using the first encryption scheme and a second entitlement control message encrypted using the second encryption scheme to a plurality of television receivers, wherein: data from the first entitlement control message is used for descrambling of the first television channel by the plurality of television receivers, and data from the second entitlement control message is used for descrambling of the second television channel by the plurality of television receivers; and
after the television service provider has transmitted the first entitlement control message and the second entitlement control message: designating, by the television service provider system, the first television channel of the plurality of television channels to be protected via a third entitlement control message encrypted using the second encryption scheme; designating, by the television service provider system, the second television channel of the plurality of television channels to be protected via a fourth entitlement control message encrypted using the first encryption scheme while the first television channel of the plurality of television channels is protected using the second encryption scheme; and transmitting, by the television service provider system, the third entitlement control message encrypted using the second encryption scheme and the fourth entitlement control message encrypted using the first encryption scheme, wherein: the third entitlement control message is used for decryption
of the first television channel, and the fourth entitlement control message is used for decryption of the second television channel.

8. The method for encrypting multiple television channels using multiple encryption schemes of claim 7, wherein
the first entitlement control message encrypted using the first encryption scheme requires more processing by a television receiver of the plurality of television receivers to decrypt than the second entitlement control message encrypted using the second encryption scheme.

9. The method for encrypting multiple television channels using multiple encryption schemes of claim 7, further comprising:
transmitting, by the television service provider system, the plurality of channels concurrently to a plurality of television receivers using the single transponder stream, wherein:
data from the first entitlement control message is required to descramble the first television channel; and
data from the second entitlement control message is required to concurrently descramble the second television channel during a time period the first television channel is being descrambled.

10. The method for encrypting multiple television channels using multiple encryption schemes of claim 7, wherein:
at a given time, only one television channel of the plurality of television channels transmitted concurrently using the single transponder stream is protected using the first encryption scheme.

11. The method for encrypting multiple television channels using multiple encryption schemes of claim 7, further comprising:
decrypting, by a smartcard of a television receiver, the first entitlement control message, wherein the television receiver is of the plurality of television receivers;
decrypting, by the smartcard of the television receiver, the second entitlement control message; and
descrambling, by the television receiver, the first television channel using data from the first entitlement control message; and
descrambling, by the television receiver, the second television channel using data from the second entitlement control message concurrently while descrambling the first television channel using data from the first entitlement control message.

12. The method for encrypting multiple television channels using multiple encryption schemes of claim 11, wherein:
decrypting, by the smartcard of the television receiver, the first entitlement control message takes a longer period of time than decrypting the second entitlement control message.

13. A non-transitory processor-readable medium for encrypting multiple television channels, comprising processor-readable instructions configured to cause one or more processors to: designate a first television channel of a plurality of television channels to be protected via a first entitlement control message using a first encryption scheme, wherein the plurality of television channels are transmitted using a single transponder stream; designate a second television channel of the plurality of television channels to be protected via a second entitlement control message encrypted using a second encryption scheme while the first television channel of the plurality of television channels is protected using the first encryption scheme; and cause the first entitlement control message encrypted using the first encryption scheme and a second entitlement control message encrypted using the second encryption scheme to be transmitted to a plurality of television receivers, wherein:
data from the first entitlement control message is used for descrambling of the first television channel by the plurality of television receivers, and data from the second entitlement control message is used for descrambling of the second television channel by the plurality of television receivers; wherein the processor-readable instructions, when executed by the one or more processors, cause the one or more processors to: after the television service provider has transmitted the first entitlement control message and the second entitlement control message: designate the first television channel of the plurality of television channels to be protected via a third entitlement control message encrypted using the second encryption scheme; designate the second television channel of the plurality of television channels to be protected via a fourth entitlement control message encrypted using the first encryption scheme while the first television channel of the plurality of television channels is protected using the second encryption scheme; and cause the third entitlement control message encrypted using the second encryption scheme and the fourth entitlement control message encrypted using the first encryption scheme to be transmitted, wherein: the third entitlement control message is used for decryption of the first television channel, and the fourth entitlement control message is used for decryption of the second television channel.

14. The non-transitory computer-readable medium for encrypting multiple television channels using multiple encryption schemes of claim 13, wherein
the first entitlement control message encrypted using the first encryption scheme requires more processing by a television receiver of the plurality of television receivers to decrypt than the second entitlement control message encrypted using the second encryption scheme.

15. The non-transitory computer-readable medium for encrypting multiple television channels using multiple encryption schemes of claim 13, wherein the processor-readable instructions, when executed by the one or more processors, cause the one or more processors to:
cause the plurality of channels to be transmitted concurrently to a plurality of television receivers using the single transponder stream, wherein:
data from the first entitlement control message is required to descramble the first television channel; and
data from the second entitlement control message is required to concurrently descramble the second television channel during a time period the first television channel is being descrambled.

16. The non-transitory computer-readable medium for encrypting multiple television channels using multiple encryption schemes of claim 13, wherein:
    at a given time, only one television channel of the plurality of television channels transmitted concurrently using the single transponder stream is protected using the first encryption scheme.

\* \* \* \* \*